(12) United States Patent
Liu et al.

(10) Patent No.: US 11,599,154 B2
(45) Date of Patent: Mar. 7, 2023

(54) ADAPTIVE ENCLOSURE FOR A MOBILE COMPUTING DEVICE

(71) Applicant: Intel Corporation, Santa Clara, CA (US)

(72) Inventors: Min Liu, Portland, OR (US); Lakshman Krishnamurthy, Portland, OR (US); David L. Graumann, Portland, OR (US); Jameson H. Williams, Portland, OR (US); Miriam K. Selvaraj, Cupertino, CA (US); Bryan R. Peebler, El Dorado Hills, CA (US); Wendy A. March, Portland, OR (US); Brian K. Vogel, Santa Clara, CA (US); Wenbo Shen, Beijing (CN); Sihua Tian, Beijing (CN); Lijuan Xiao, Beijing (CN); Tao Wang, Beijing (CN); Xiaoyan Dang, Beijing (CN); Nithyananda S. Jeganathan, Portland, OR (US); Sunil A. Kulkarni, Portland, OR (US); Sherman Chan Wai Lee, Bukit Mertajam (MY); Kaining Yuan, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/460,983

(22) Filed: Aug. 30, 2021

(65) Prior Publication Data

US 2022/0057841 A1   Feb. 24, 2022

Related U.S. Application Data

(63) Continuation of application No. 17/092,783, filed on Nov. 9, 2020, now Pat. No. 11,106,246, which is a
(Continued)

(51) Int. Cl.
*G06F 3/044* (2006.01)
*G06F 1/16* (2006.01)
(Continued)

(52) U.S. Cl.
CPC .......... *G06F 1/1656* (2013.01); *G06F 3/044* (2013.01); *G06F 3/0445* (2019.05);
(Continued)

(58) Field of Classification Search
CPC ........ G06F 3/041; G06F 3/044; G06F 3/0445; G06F 3/04842; G06F 3/0488;
(Continued)

(56) References Cited

U.S. PATENT DOCUMENTS

| 6,888,532 B2 | 5/2005 | Wong et al. |
| 8,698,764 B1 | 4/2014 | Karakotsios et al. |

(Continued)

FOREIGN PATENT DOCUMENTS

| CN | 201203861 | 3/2009 |
| CN | 101535933 A | 9/2009 |

(Continued)

OTHER PUBLICATIONS

PCT International Search Report and Written Opinion in International Application No. PCT/CN2013/090282 dated Sep. 4, 2014.
(Continued)

*Primary Examiner* — Alexander Eisen
*Assistant Examiner* — Cory A Almeida
(74) *Attorney, Agent, or Firm* — Patent Capital Group

(57) ABSTRACT

A device includes an enclosure and logic. The enclosure includes a plurality of capacitive touch sensor arrays disposed at least on two of a top side, a bottom side, a left side, a right side, a front side, and a back side of the device. The enclosure also includes a first display on the front side of the device. The logic receives touch interaction information
(Continued)

from the plurality of capacitive touch sensor arrays and initiates an action based at least in part on the touch interaction information.

16 Claims, 24 Drawing Sheets

Related U.S. Application Data continuation of application No. 15/038,657, filed as application No. PCT/CN2013/090282 on Dec. 24, 2013, now Pat. No. 10,831,318.

(51) Int. Cl.
  *G06F 3/04815* (2022.01)
  *G06F 3/04883* (2022.01)
  *G06F 3/04842* (2022.01)
  *G06F 3/0488* (2022.01)

(52) U.S. Cl.
  CPC ........ *G06F 3/0488* (2013.01); *G06F 3/04815* (2013.01); *G06F 3/04842* (2013.01); *G06F 3/04883* (2013.01); *G06F 2200/1636* (2013.01); *G06F 2203/04101* (2013.01); *G06F 2203/04808* (2013.01)

(58) Field of Classification Search
  CPC ............. G06F 3/04815; G06F 3/04883; G06F 1/1656; G06F 2203/04101; G06F 2200/1636; G06F 2203/04808
  See application file for complete search history.

(56) References Cited

U.S. PATENT DOCUMENTS

| | | | |
|---|---|---|---|
| 8,723,824 B2* | 5/2014 | Myers | G06F 1/1626 345/173 |
| 10,831,318 B2 | 11/2020 | Liu et al. | |
| 2005/0184955 A1 | 8/2005 | Wong et al. | |
| 2006/0197750 A1* | 9/2006 | Kerr | G06F 1/1647 345/173 |
| 2007/0097151 A1 | 5/2007 | Rosenberg | |
| 2007/0296693 A1 | 12/2007 | Wong et al. | |
| 2008/0111795 A1 | 5/2008 | Bollinger | |
| 2009/0315834 A1* | 12/2009 | Nurmi | G06F 3/0487 345/173 |
| 2010/0171699 A1 | 7/2010 | Wong et al. | |
| 2011/0055696 A1 | 3/2011 | Dollar et al. | |
| 2013/0076619 A1 | 3/2013 | Carr et al. | |
| 2014/0225857 A1* | 8/2014 | Ma | G06F 3/0418 345/174 |
| 2014/0243092 A1 | 8/2014 | Morita et al. | |
| 2016/0291731 A1 | 10/2016 | Liu et al. | |
| 2021/0132665 A1 | 5/2021 | Liu et al. | |

FOREIGN PATENT DOCUMENTS

| | | |
|---|---|---|
| CN | 101907921 A | 12/2010 |
| DE | 202007019513 U1 | 6/2013 |
| EP | 2102734 A2 | 9/2009 |
| TW | 200839590 A | 10/2008 |
| WO | 2008064007 A2 | 5/2008 |
| WO | 2015096020 A1 | 7/2015 |

OTHER PUBLICATIONS

USPTO Final Office Action issued in U.S. Appl. No. 15/038,657 dated Feb. 25, 2020; 19 pages.
USPTO Final Office Action issued in U.S. Appl. No. 15/038,657 dated Jan. 8, 2018; 19 pages.
USPTO Final Office Action issued in U.S. Appl. No. 15/038,657 dated May 16, 2019; 16 pages.
USPTO Non-Final Office Action issued in U.S. Appl. No. 15/038,657 dated Aug. 28, 2019; 18 pages.
USPTO Non-Final Office Action issued in U.S. Appl. No. 15/038,657 dated Aug. 3, 2017; 16 pages.
USPTO Non-Final Office Action issued in U.S. Appl. No. 15/038,657 dated Dec. 14, 2018; 15 pages.
USPTO Non-Final Office Action issued in U.S. Appl. No. 15/038,657 dated Jun. 21, 2018; 15 pages.
USPTO Notice of Allowance issued in U.S. Appl. No. 15/038,657 dated Jul. 8, 2020; 7 pages.
USPTO Notice of Allowance issued in U.S. Appl. No. 17/092,783 dated May 3, 2021; 13 pages.

\* cited by examiner

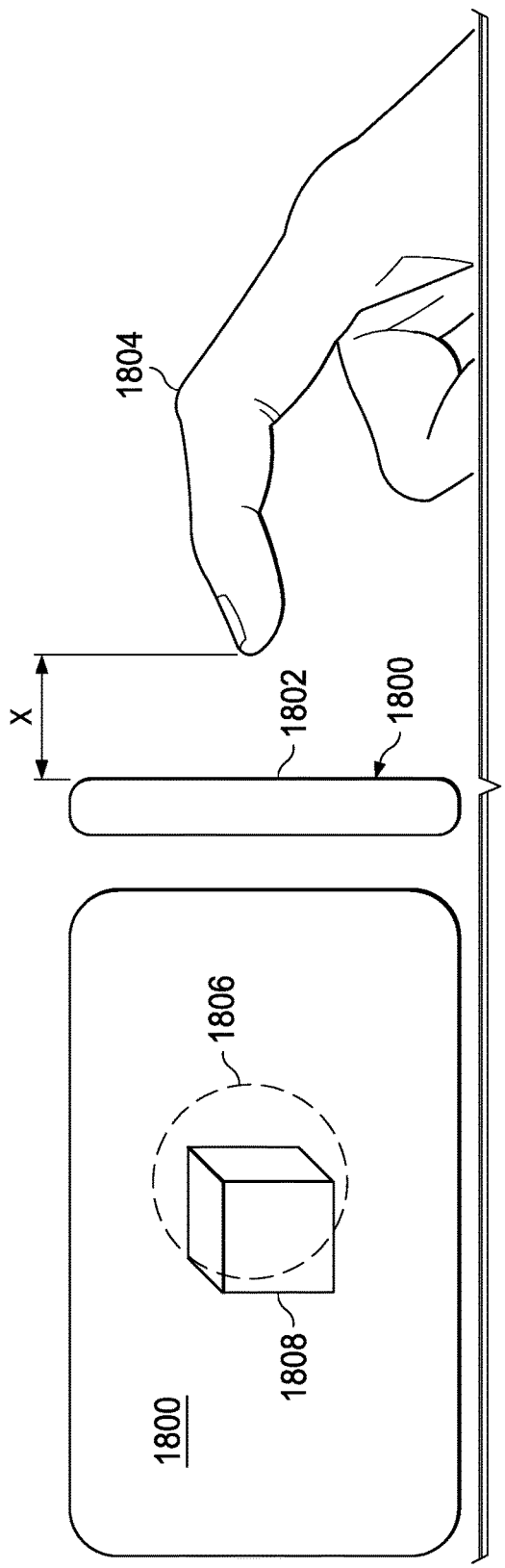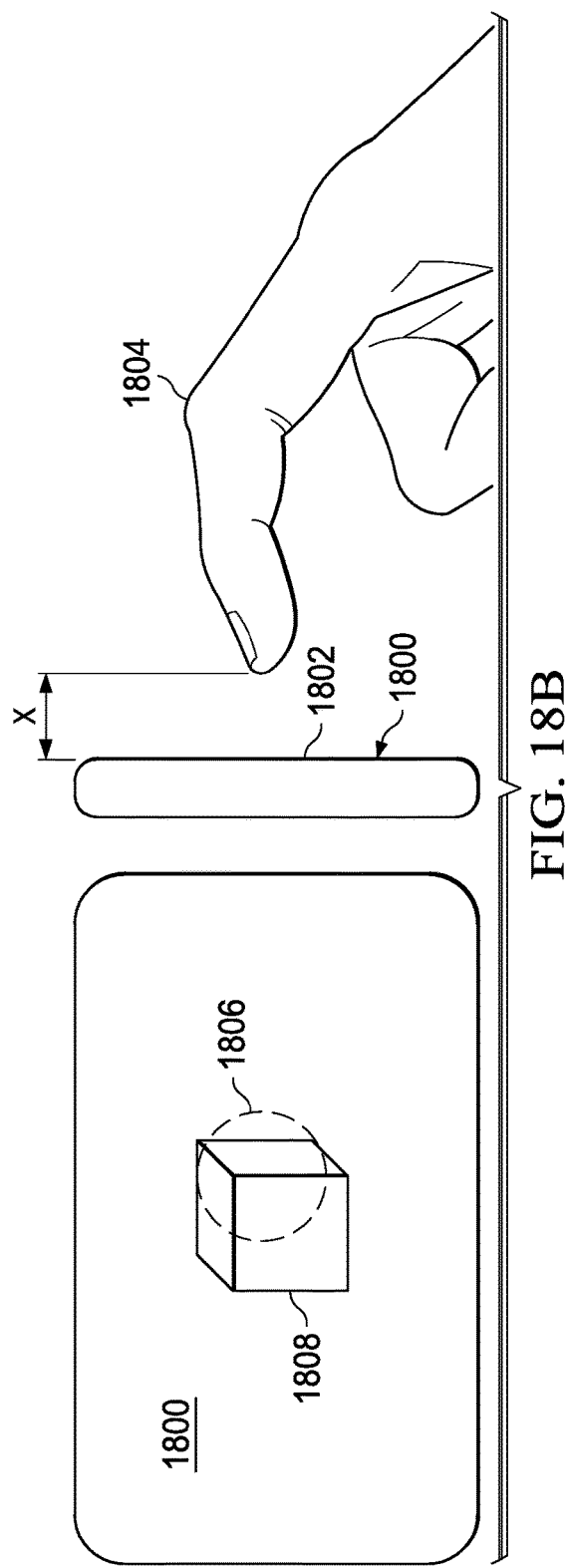

ADAPTIVE ENCLOSURE FOR A MOBILE COMPUTING DEVICE

CROSS-REFERENCE TO RELATED APPLICATIONS

This Application is a continuation (and claims the benefit of priority under 35 U.S.C. § 120) of U.S. Ser. No. 17/092,783, filed Nov. 9, 2020, now U.S. Pat. No. 11,106,246, issued Aug. 31, 2021, entitled "ADAPTIVE ENCLOSURE FOR A MOBILE COMPUTING DEVICE," which is a continuation of U.S. Ser. No. 15/038,657, files May 23, 2016, now U.S. Pat. No. 10,831,318, issued Nov. 10, 2020, entitled "ADAPTIVE ENCLOSURE FOR A MOBILE COMPUTING DEVICE," which is a national stage application under 35 U.S.C. § 371 of PCT International Application Serial No. PCT/CN2013/090282, filed on Dec. 24, 2013, entitled "ADAPTIVE ENCLOSURE FOR A MOBILE COMPUTING DEVICE," which are hereby incorporated by reference in their entirety.

TECHNICAL FIELD

Embodiments that are disclosed relate to mobile computing device enclosures.

BACKGROUND

Mobile devices, such as smartphones, tablets, portable video game systems, and phablets (a portmanteau term for a smartphone as large as a small-sized tablet, as well as for a small-sized tablet with telephony), have a basic touchscreen capability. This touchscreen permits a user to interact with objects displayed on the touchscreen by touching areas thereon. It is an intuitive interface to play games, scroll through pages of a book or pictures of a slideshow, browse webpages on the Internet, zoom in/out of pictures, and input keyboard strokes.

Existing mobile devices have only one touch screen and fixed location (e.g., hardware) buttons along the sides of the devices. Accordingly, a user needs to locate where the buttons are along the sides of the device and hold the device in such a way that the user's fingers can access the fixed location buttons (e.g., power, volume, etc.). The buttons' locations and the device size can be uncomfortable for some users due to the users' hand size and hold pattern.

Further, for people with small hands, these devices are sometimes hard to manipulate with just one hand.

When a user holds the device in one hand and uses his or her other hand to press a button on one side of the device, the user might counter this motion by tightly holding his or her fingers on the other side of the device. This tight holding can cause an unintended button pressing and undesired functional changes to the device.

In addition, in single-handed operations, a user might need to switch hand-hold patterns between viewing content on the front display and touch interactions with the device. When the user views the content, the user's thumb might lie along the side of the device to support a firm grip of the device. To switch to a single-handed touch interaction, the hand grip sometimes changes so that the thumb is freed up to touch the front display. This grip switching is not comfortable and risks dropping the device. To avoid this risk, many users engage the other hand for two-handed touch interaction operations, which may not be feasible under certain circumstances.

Additionally, many mobile devices do not provide multi-task controls. Only one application (app) may be in use at any given time, even if a second app would merely display a limited amount of information. For example, the first app would have to be paused or stopped to check the current temperature, and then the first app would have to be resumed or restarted.

In other instances, when a user is performing an activity (e.g., reading email or browsing the Internet) and an incoming phone call is received, some devices stop the current activity and bring up buttons or sliders on the touchscreen for the user to answer or reject the call.

In addition, current touchscreens limit user interaction with three-dimensional (3D) objects on the touchscreen. As an example, a user can only pat a 3D ball from the touchscreen. The user thus has to rely on unnatural, indirect gestures to access the non-touchable dimensions of 3D objects.

Further, as a user's finger interacts with the screen, that finger can hinder the user from seeing what he or she is actually touching. For example, while playing one popular game, the user has to swipe the screen to trigger a movement of a game character, but the swiping action blocks the game character from the view of the user. A similar issue is noticed when zooming in on an object, scrolling, or swiping across pictures, videos, etc.

Similarly, it can be difficult for a user to touch and move to a point precisely on the touchscreen, because the user's target point is often shaded by the user's finger. Even if there is a cursor provided by an application, the cursor might be smaller than the user's fingertip.

Existing solutions do not have robust intelligence for detecting user hand-hold context information. For example, existing solutions use motion sensors to detect a device orientation and rotate display content accordingly. These motion sensors can cause an unintended and erratic screen rotation when the device is moved or tilted.

Much of the time, a user merely desires a limited amount of information that can be presented with a text-based display or with minimal graphics. As such, it is not always required to fire up the front display. As the display of a mobile device is a significant power consumer, reducing this power consumption would greatly enhance the battery life.

The bezels of mobile devices are becoming thinner and thinner nowadays. Therefore, sometimes a touch event on the edges of the front screen is actually a grip to be detected and suppressed.

Conventional edge detection and grip suppression for touch panels are all about the location, dimension, shape and persistence of a touch on one single flat surface (not in a 3D space). Thus, these technologies make mistakes (e.g., a false touch event, a false suppression, a performance deduction, etc.).

Further, when users grip the mobile device, some touch operations or gestures are performed on a side of the mobile device.

BRIEF DESCRIPTION OF THE DRAWINGS

FIGS. 18A-18D illustrate a backside pointer implementation for the adaptive enclosure device to allow for a precise back side pointer contact location.

DETAILED DESCRIPTION

Some embodiments described include a back and side capacitive touch sensor array for a mobile device. This inclusion, in addition to a front capacitive touch sensor array, allows for a fully adaptive enclosure to provide additional functionality for a better user experience with the mobile device. Some current solutions require the user to adapt to the mobile device; the adaptive nature of the described enclosure allows for the mobile device to more specifically adapt to the user.

Figure 1A:
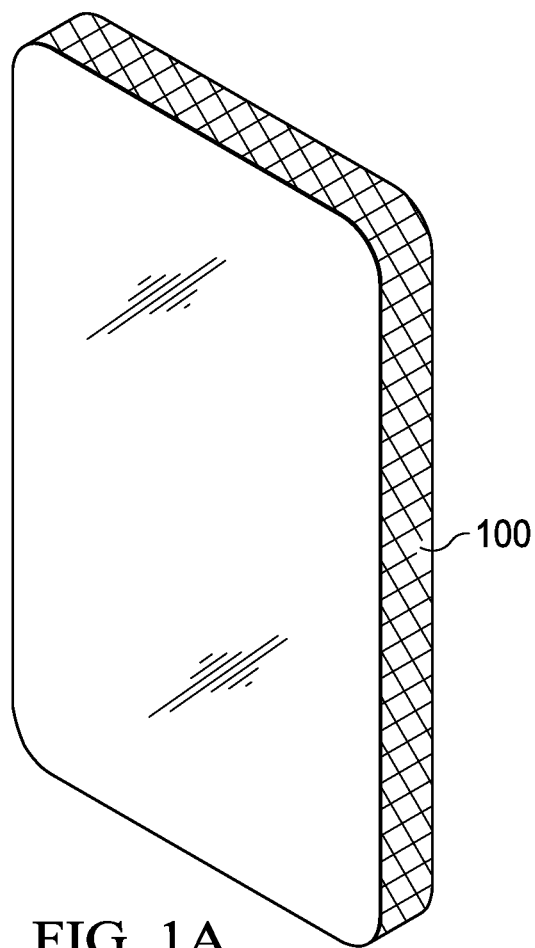
FIGS. 1A, 1B, and 1C illustrate a mobile device with a sensor array on the top, bottom, left, and right sides.
Figure 1B:
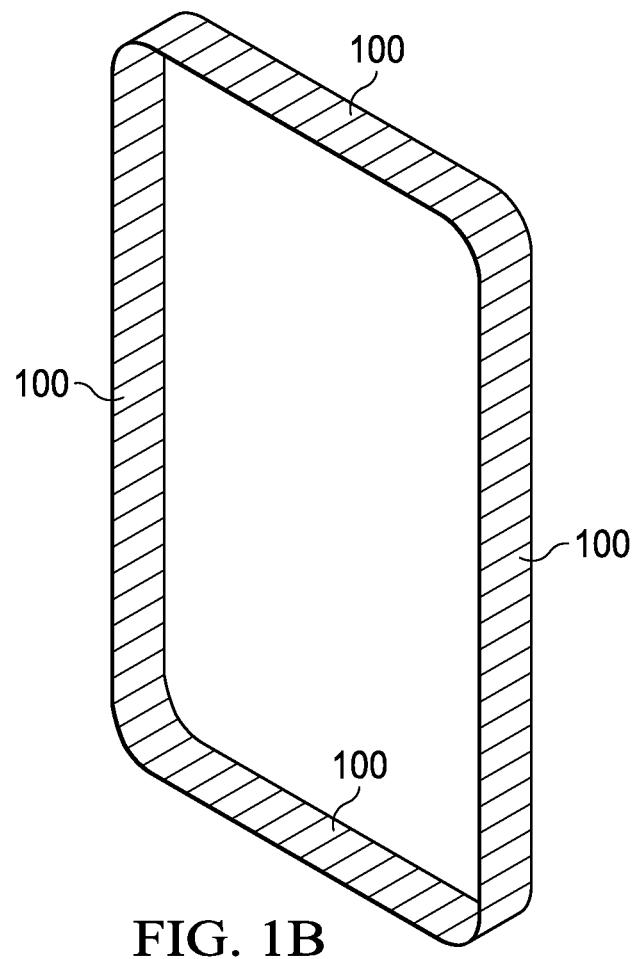
Figure 1C:
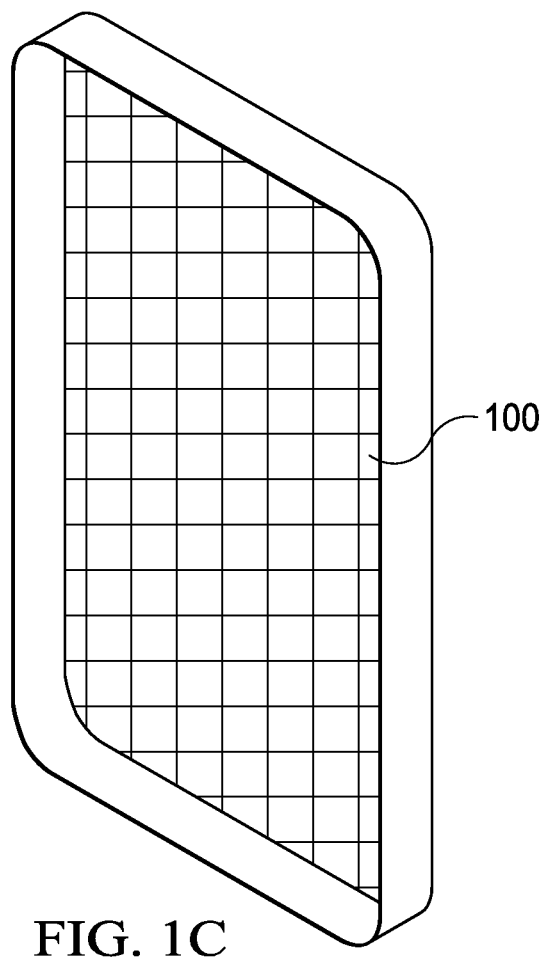

FIGS. 1A, 1B, and 1C illustrate a mobile device with a sensor array 100 on the top, bottom, left, and right sides. In some embodiments, the front side of the mobile device includes a speaker and a microphone, generally at opposing ends of the front side. The front side can also include a display (such as a touchscreen including the sensor array) and one or more hardware buttons.

In some implementations, the back side of the mobile device includes a camera. This inclusion of the camera is no way limited to the back side of the device: recently, cameras have been included in the front of the device, as well. In embodiments in which the front side camera differs from the back side camera, the front side camera is sometimes better suited to closer subjects, whereas the back side camera is better suited to more distant subjects. It is also possible the back side camera is of a higher quality, such as by offering a higher resolution image or a greater zoom ability.

The back side of the mobile device can also include a hardware button. Although the back side can include a display, this inclusion is not typically the case.

Hardware features of the top and bottom sides and the right and left sides generally depend on a manufacturer's preference. In one implementation, a power button is located on the right side or the top side of the device. A headphone jack can be included on the bottom side. A mini or micro USB connector is often included on the right side, the left side, or the bottom side of the device, though such a connector can also be implemented on the top side. Of course, the power button, the headphone jack, and the USB connector can be included on any side or can be absent.

Typically, the display (or displays) are rectangular but are, of course, not limited to that shape. Currently, smartphones commonly include a rectangular display in which the nominal vertical direction is in the direction of the length of the display. Thus, the top side and the bottom side are typically viewed as being at opposing ends of the length of the screen. In contrast, the right side and the left side of the device are typically viewed as being at opposing ends of the width of the display.

Currently, portable video game systems include a rectangular display in which the nominal vertical direction of the screen is in the direction of the width of the display. Thus, the top side and the bottom side are typically viewed as being at opposing ends of the width of the screen. The right side and the left side are typically viewed as being at opposing ends of the length of the screen.

The above descriptions are not limiting. For example, some smartphones can play video games, and some portable video game systems can interact with cellular telephone networks. Similarly, such devices can rotate an image, so that the nominal vertical direction of the screen does not always correspond to a vertical direction of a displayed image.

The orientations of the top and bottom sides and the right and left sides are somewhat based on a default image position on the screen. Some mobile devices include sensors (e.g., tilt sensors or accelerometers) that determine a change in orientation of the device and modify the image position based thereon. Other mobile devices include a hardware keyboard that extends from a side of the device, the extension of which can result in a modified image position. Thus, a person skilled in the relevant art understands that, although the sides can be somewhat subjective, the sides are understood in any particular implementation.

In some embodiments, the side sensor array is coupled to a sensor array on the back side of the device and/or the front side of the device, though such coupling is not required. In many embodiments, each of the six sides of the device has a separate sensor array. In other embodiments, two or more of the sides have a single sensor array that wraps around the device or is coupled in other manners. For example, there can be a separate sensor array for the front, for the back, and one for all four sides. In another example, the four sides and back have a single array, separate from the front array.

Additionally, the sensor pitch on the side array(s) can be the same as the sensor pitch on the back or the front, though the same is not required.

Figure 2:
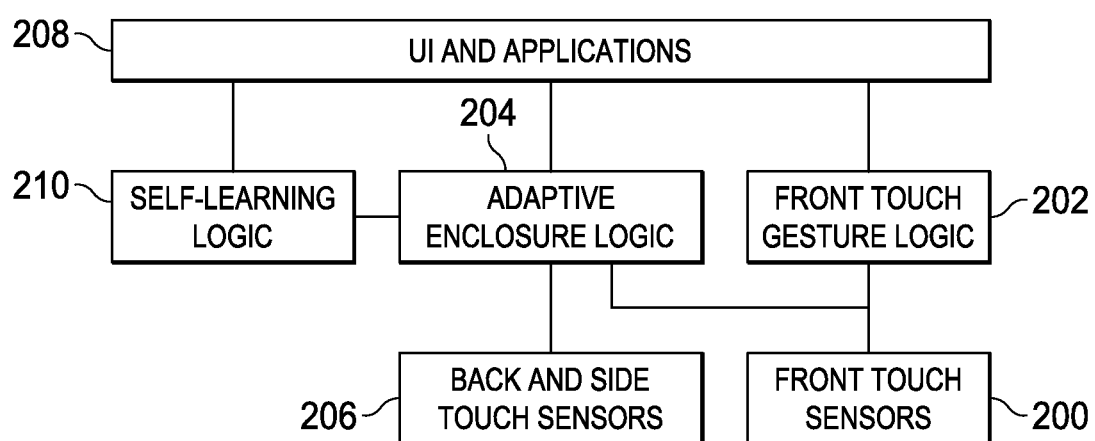
FIG. 2 illustrates a high-level architecture of the adaptive enclosure in many embodiments.

FIG. 2 illustrates a high-level architecture of the adaptive enclosure in many embodiments. The front touch sensors 200 feed sensor input to both front touch gesture logic 202 as well as adaptive enclosure algorithm logic 204. The back and side touch sensors 206 feed sensor input to the adaptive enclosure algorithm logic 204. The adaptive enclosure algorithm logic 204 includes logic that detects hand grips, hand jitter filtering logic, and touch gesture recognition logic. These elements provide information to self-learning logic 210 as well as to the user interface (UI) and one or more operating systems and/or applications 208 running on the mobile device.

To increase the effectiveness of distinguishing intended gestures from unintended hand or finger movements, the self-learning logic 210 can continuously gather data to refine the adaptive enclosure's knowledge base on a person holding the device and in what orientation. The self-learning logic 210 can receive data from back and side touch sensors 206, and front touch sensors 200. This data can be interpreted as adaptive enclosure interactive gestures. The adaptive enclosure logic 204 interprets this 'touch interaction data' (i.e., the data that is a result of a touch interaction between a user and one or more of the touch sensor arrays) and sends it to the UI and applications 208. The algorithm logic 204 and UI and applications 208 receive this information and can decide if the information comprises one or more valid gestures. If the algorithm logic 204 or UI and applications 208 interpret the data as not valid, a message is sent to the self-learning logic 210. The self-learning logic 210 keeps track of the validity of the gestures. Once a certain threshold is reached, the self-learning logic 210 will inform the adaptive enclosure algorithm logic 204 to invalidate specified gestures.

The self-learning logic 210 can keep track of data on a user-by-user basis to adapt to users individually. The self-learning logic 210 can create a usage model for each user, which is a learning model of how a given user holds and interacts with the device. The more precise is the tracking of the usage model per user, the more easily the device can identify a user holding the device. Additionally, the self-learning logic 210 can also have different models per user for how to track positive contacts versus inadvertent contacts.

The self-learning logic 210 can keep track of grip patterns, grip pressure, gesture commonalities, etc., and provide information as feedback to the adaptive enclosure algorithm logic to create a training ability. This feedback allows the adaptive enclosure algorithm logic to increase accuracy of gesture recognition and user recognition over time.

Due to the nature of the adaptive enclosure, an object being displayed on the device can be thought of as being inside of the enclosure and able to be manipulated from all sides of the device/object. For example, a 3D object, such as a cube, can be displayed and can be manipulated from all sides of the cube based on user interaction with the six sides of the device (i.e., front, back, top, bottom, left, and right). For 3D gestures used to manipulate the user interface and interact with objects and information within the device, touch sensor data from front touch sensors 200 and back and side touch sensors 206 are sent to the adaptive enclosure algorithm logic 204. This touch sensor data allows a combination of all around touch data to create 3D gestures and 3D manipulations. More detailed descriptions of 3D gestures and manipulations will be discussed below.

Figure 3:
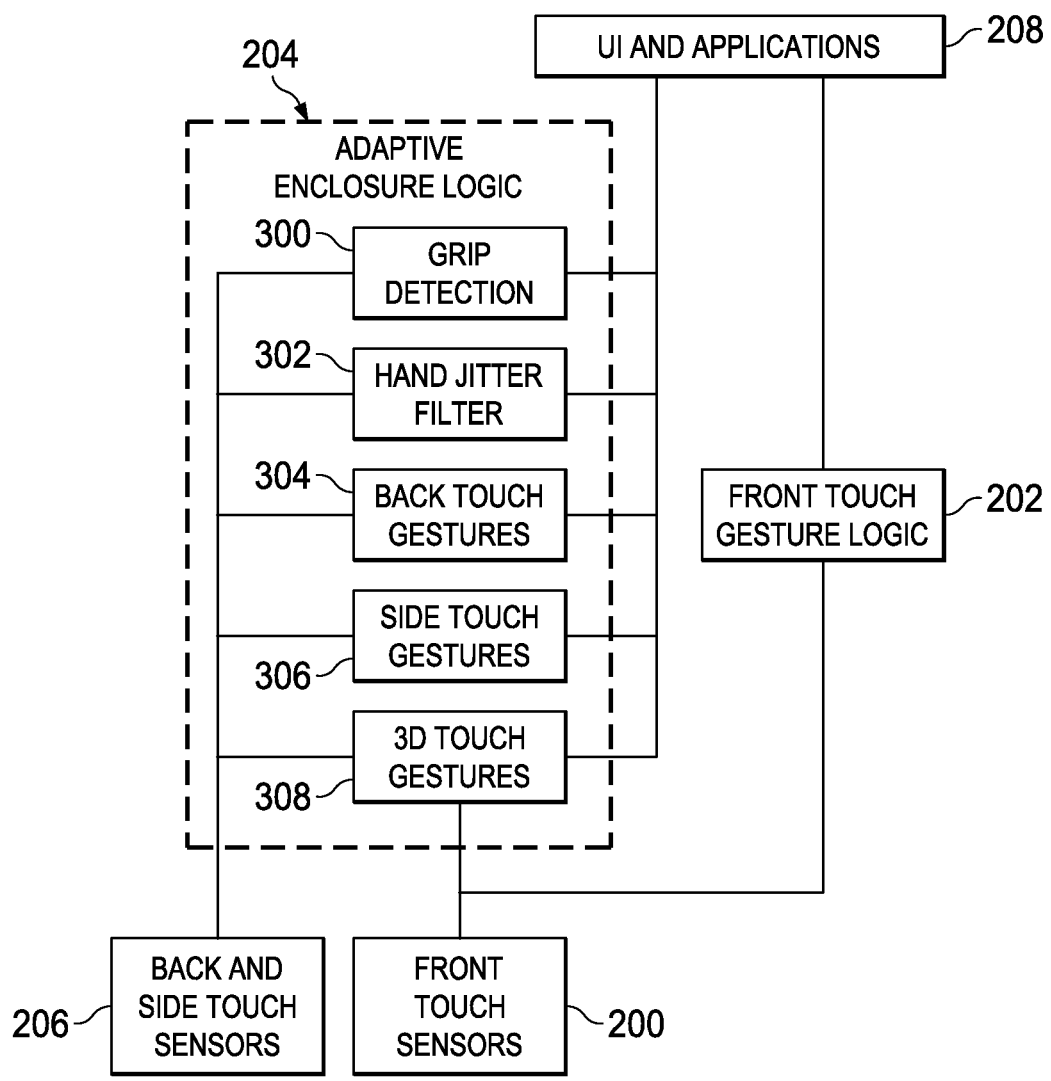
FIG. 3 illustrates an embodiment of the detailed adaptive enclosure logic architecture.

FIG. 3 illustrates an embodiment of the detailed adaptive enclosure logic architecture. This logic architecture can be implemented in software, firmware, or hardware (or a combination of two or more forms of logic). In FIG. 3, the sensor data are read from the back and side capacitive touch sensors 206, as well as from the front capacitive touch sensors 200. This data can be sent to many different specific logic units that detect and utilize different touches and manipulations of the adaptive enclosure. These logic units include a grip detection logic unit 300, a hand jitter filter logic unit 302, a back touch gesture logic unit 304, a side touch gestures logic unit 306, and a 3D touch gestures logic unit 308, among others.

The grip detection logic unit 300 can make determinations based on how a user is holding the adaptive enclosure. The grip detection logic unit 300 can determine whether the user simply is holding the enclosure, manipulating the UI displayed on the enclosure, or a combination of both. Additionally, the grip detection logic unit 300 identifies the grip of a specific user. For example, a parent might be holding the adaptive enclosure and hand the enclosure over to a child. The grip detection logic unit 300 can determine the grip change and notify the UI and applications 208. The grip detection logic unit 300 also can ascertain the hand orientation of the user (i.e., left hand grip versus right hand grip). The grip detection logic unit 300 is further described below.

The hand jitter filter logic unit 302 can determine whether the movement of each contact point between a portion of a hand/finger and the adaptive enclosure is due to a determined manipulation by the user or simply a byproduct of a hand in contact with the device through inadvertent touching or general gripping. This determination can be accomplished using a temporal filter and a spatial filter, integrated into the hand jitter filter logic unit 302. The temporal filter determines the length of time of a given touch event. The spatial filter determines the physical distance between multiple touch events as well as the significance of the contact of a given touch event (e.g., did a fingertip barely brush a surface or come into significant contact with a surface?). More details of the hand jitter filter logic unit 302 are described below. This significance determination can be based on the magnitude of the pressure of the contact as well as the distance, velocity, or acceleration of the contact.

Some embodiments address an issue in conventional technologies in which a gesture with more than one finger requires a mobile device user to use both hands or to place the device on a surface to only use single-handed control.

The adaptive enclosure allows gesture control to be a multi-touch level, hence enabling single-hand usage of the enclosure. By utilizing a rear touch sensor, the second and/or third touch can be made while allowing the thumb to be the primary control at the front touch sensor.

Multi-touch gestures can be achieved by combining two or more fingers, such as index and/or middle finger(s) at the rear, and a thumb at the front touch sensor.

As users become more mobile and multi-task, single hand control of the mobile device can provide more flexibility.

For example, a user might be holding shopping bags with one hand, while the other hand holds a mobile device. Further, the user might be reading a document and wish to zoom for a clearer view. The user can opt to use both hands and place the shopping bags down, in which case she later needs to pick them up again, or she can go through several menu options to zoom the page.

Currently, most systems allow a double tap for zooming, but the zoom level may not be sufficient, as some users require more in-depth zooming.

The back touch gestures logic unit 304 interprets hand and finger gestures that occur on the back of the device from the data captured by the sensors. Table 1 illustrates a partial list of gestures that occur on the back of the device and are supported in one embodiment.

TABLE 1

Back gestures.

| Back Gestures | Details | Usage Example |
|---|---|---|
| Swipe Left | Swipe one finger or multiple fingers from right to left on the back of the device | Scroll to the left on a web browser, ebook, slideshow, or file manager |
| Swipe Right | Swipe one finger or multiple fingers from left to right on the back of the device | Scroll to the right on a web browser, ebook, slideshow, or file manager |
| Swipe Up | Swipe one finger or multiple fingers from bottom to top on the back of the device | Scroll up on a web browser or ebook; or zoom out on a camera or image; or escape from current application |
| Swipe Down | Swipe one finger or multiple fingers from top to bottom on the back of the device | Scroll down on a web browser or ebook; or zoom in on a camera or image; or minimize application |
| Tap Left Top | Tap one finger or multiple fingers on the left top region on the back of the device | Use sword in a game |
| Tap Left Bottom | Tap one finger or multiple fingers on the left bottom region on the back of the device | Throw bomb in a game |
| Tap Right Top | Tap one finger or multiple fingers on the right top region on the back of the device | Fire gun in a game |
| Tap Right Bottom | Tap one finger or multiple fingers on the right bottom region on the back of the device | Fire missile in a game |
| Tap | Tap anywhere on the back of the device | Take a picture in a camera application; or zoom in on 3D object |
| Double Tap | Double tap anywhere on the back of the device | Take a burst of pictures in a camera application |
| Pinch | Two fingers touch down on the back of the device and move closer to each other | Zoom in on a web browser, ebook, or photo viewer |
| Reverse Pinch | Two fingers touch down on the back of the device and move farther apart from each other | Zoom out on a web browser, ebook, or photo viewer |
| Circle | One finger draws a clockwise circle on the back of the device | Rotate the display content clockwise |
| Reverse Circle | One finger draws a counter clockwise circle on the back of the device | Rotate the display content counter clockwise |

As shown above, the adaptive enclosure can be developed into a gaming controller that has several specific buttons to improve a gaming experience for the user. Human fingers have muscle memory: thus, a user that practices with such a touch controller can easily adapt the areas to their needs in a short time, even though the buttons are not dedicated hardware buttons. Since a typical sensor is capable of sensing ten fingers simultaneously, handling the response from the adaptive enclosure is possible without adding any significant extra complexity into the system or software. One embodiment of this handling is detailed below.

Other actions can be implemented with a combination of gestures on both the back and the front.

TABLE 1

Combination gestures.

| Action/Gesture | Rear Touch | Front Touch |
|---|---|---|
| Zoom-in | Index Finger (hold) | Thumb (Swipe) - Place the thumb at the top and move the thumb away from the index finger position (downward) to zoom-in |
| Zoom-out | Index Finger (hold) | Thumb (Swipe) - Place the thumb at the bottom and move the thumb towards the index finger position (upward) to zoom-out |
| Rotate Left - Photo will be rotated 90 degrees to the left | Index Finger (hold) | Thumb (Swipe) - Place the thumb on the middle left and move the thumb in a circular motion anti-clockwise to rotate photos |
| Rotate Right - Photo will be rotated 90 degrees to the right | Index Finger (hold) | Thumb (Swipe) - Place the thumb on the middle left and move the thumb in a circular motion clockwise to rotate photos |
| Minimize - Current running application will be minimized and the main menu will be shown | Index and Middle Finger (Swipe) - With both fingers positioned at the top, move both fingers downwards to minimize application that is running | N/A |
| Maximize - Last viewed application will be maximized | Index and Middle Finger (Swipe) - With both fingers positioned in the middle, move both fingers upwards to maximize the last viewed application | N/A |
| Back - Goes back to previous page while browsing | Index Finger (hold) | Thumb (Swipe) - Place the thumb on the middle right and move the thumb left to go back |
| Forward - Goes forward to latest page while browsing | Index Finger (hold) | Thumb (Swipe) - Place the thumb on the middle left and move the thumb right to move forward |

The side touch gestures logic unit 306 interprets hand and finger gestures that occur on the sides of the device (top, bottom, left, and right) from the data captured by the sensors. Table 2 illustrates a partial list of gestures that occur on the side(s) and are supported in one embodiment.

TABLE 3

Side gestures.

| Side Gestures | Details | Usage Example |
|---|---|---|
| Slide Up | Slide one finger upward along one side (top, bottom, left, right) of the device | Turn up audio volume |
| Slide Down | Slide one finger downward along one side (top, bottom, left, right) of the device | Turn down audio volume |

TABLE 3-continued

Side gestures.

| Side Gestures | Details | Usage Example |
|---|---|---|
| Tap | Tap one finger on one side (top, bottom, left, right) of the device | Put device to sleep |
| Double Tap | Double tap one finger on one side (top, bottom, left, right) of the device | Awaken device |
| Hand Grip Squeeze | Hand grip opposing sides of the device and gradually increase or decrease pressure of the grip | Increase/decrease slide show speed; or take a picture |
| Top Button Press | Hand hold the device with one finger on the current top side of the device and tap one finger and contact at least one side (to steady camera) | Press shutter button in camera application |

Combining the back, side, and front touch sensor logic, a user can directly access three dimensions of any 3D object presented on the computing device in a natural and intuitive way. Additionally, the object may be displayed in three dimensional space on any or all displays on the different sides of the device, giving the impression to the user as if the object was inside the adaptive enclosure device itself.

In one example, the user performs gestures on one or multiple sides of the enclosure. The enclosure displays on different sides of the device different views of the 3D object. Based on the gestures, the enclosure manipulates the 3D object. This manipulation gives the impression to the user that she is interacting in three-dimensional space with a three-dimensional object.

Table 3 illustrates a partial list of 3D gestures and manipulations that can be used for accessing 3D objects in an intuitive way according to one embodiment.

TABLE 4

3D gestures.

| 3D Gestures | Details | Usage Example |
|---|---|---|
| 3D Rotate | One finger on the back side of a 3D object (on back side of the adaptive enclosure), one finger on front side of 3D object (on front side of the enclosure), the two fingers slide in the opposite directions or one finger is still and the other finger slides | Rotate a 3D object in 3D space |
| 2D Zoom | Two fingers on one side pinch (front or back) in or out | Zoom in or out |
| 3D Stretch | At least one finger on one side of enclosure to remain still and two fingers on the other side of enclosure to pinch in or out | Stretch or shrink surface of a 3D object nearest the two fingers |
| 3D Press | At least one finger on front enclosure surface and at least one finger on back enclosure surface of device and press towards each other | Press/deform a 3D object on two opposite surfaces |

Thus, in response to a determination by a processor of the mobile device that any of the above user interactions are performed on the mobile device, the corresponding operation in the chart can be performed. Such relationships between the described user interactions and the corresponding operations are intuitive. Of course, the determination can also be performed by a processor outside of the mobile device, as well.

In addition, other 3D gestures can be input, as well. For example, a 3D object can be rolled (i.e., rotated and translated) by sliding a finger along the back. This interaction provides a user with a sense that the items in an application have a greater dimension of depth.

In some embodiments, the adaptive enclosure logic 204 encapsulates all six sides and, thus in an alternative version of FIG. 3, the front touch gesture logic 202 is also included within the adaptive enclosure algorithm logic 204.

To free a user to perform tasks without any hindrance to the view of the display, a sensor can be added on the back of the mobile device either directly on the device or on a protective skin. One potential advantage of using a sensor at the back is that many use cases, such as playing games, browsing, scrolling, zooming etc., can be performed with just the one hand currently holding the mobile device. The other hand is freed from actually touching the front touch-screen or sensor to enter user commands to the device.

This back sensor need not encompass the entire back side of the device. For example, in embodiments in which the device includes a camera on the back side of the device, the touch pad need not extend to the camera.

In implementations in which the sensor is embedded in a protective skin, a connector used to send the touch information to the mobile device can provide a direct wired connection (e.g., USB) or a wireless connection using a technology such as Bluetooth, Wi-fi, Near Field Communications (NFC), etc.

For an application to progress, all it takes is a mechanism for user swipe information to be fed into the software stack; the program will behave exactly the same way but with a better user experience as the user can see the entire screen all the time. For scrolling through pictures/files, a user can perform these actions while one hand is holding the mobile device, and the other hand swipes across the back touch surface either vertically or horizontally.

Thus, a user can handle many tasks without the use of the device requiring two hands or the user being required to touch the display on the front all the time. The user can simply interact with the adaptive enclosure to achieve a better user experience from the device. Some implementations are mode-agnostic and will work well for both portrait and landscape modes of the device.

The adaptive enclosure can thus help enhance the user experience, depending on the application. Typical scenarios of use include tapping/sliding (e.g., for playing games that do not require individual inputs).

Figure 4:
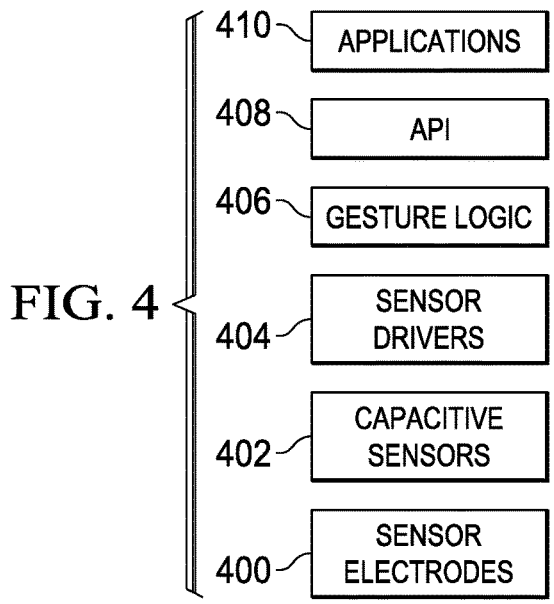
FIG. 4 illustrates an embodiment of an implementation stack utilized in a system.

FIG. 4 illustrates an embodiment of an implementation stack utilized in a system. The sensor electrodes 400 within a capacitive array change capacitance based on a user touching or nearly touching the screen. The capacitive sensors 402 capture the capacitive change into data. The sensor drivers 404 read the captured data and send the data to upper layer logic, such as gesture logic 406. In turn, gesture logic 406 interprets the received data and detects touch gestures from the data, which are then sent to the API 408. The API 408 provides a communication interface from the gesture logic 406 to upper layer applications 410. Finally, the applications 410 receive and respond to the received touch gestures. By implementing this stack and having an enclosure that has capacitive touch sensor arrays on up to all six sides, an adaptive device can be realized.

The adaptive enclosure device is capable of any number of user-friendly gesture implementations. Specifically, the adaptive enclosure can enable the device to adapt to the user. In many embodiments, the adaptation to the user is in the form of the provision of UI elements, such as virtual buttons, sliders, etc., on the back and the sides of the device and in a position accommodating the way in which the user holds onto the device. In some embodiments, the virtual buttons can be dragged from one position to another. In embodiments in which there are displays on a side or the back (in addition to the front side), the buttons can be dragged and dropped on the respective side or to any other side. In other embodiments, the representations (e.g., images) of the buttons can be dragged and dropped on the front display. During such a drag and drop, the representations can be displayed on the front display translucently or grayed-out, for example. Thus, a user can hold the device in the most comfortable way for that individual, and the device will adapt to how the user holds the device. For example, the user can roll/slide his or her fingers along the side of the device to control a media player volume, or tap his or her fingers along the side or back of the device to fire a different weapon in a video game or capture a picture using a built-in camera.

The adaptive enclosure additionally provides several single and multi-handed usage models and context switches. For example, in a single-handed usage switch, without changing a touch grip pattern, usage switching can occur between a viewing mode and a touch interaction mode.

Figure 5:
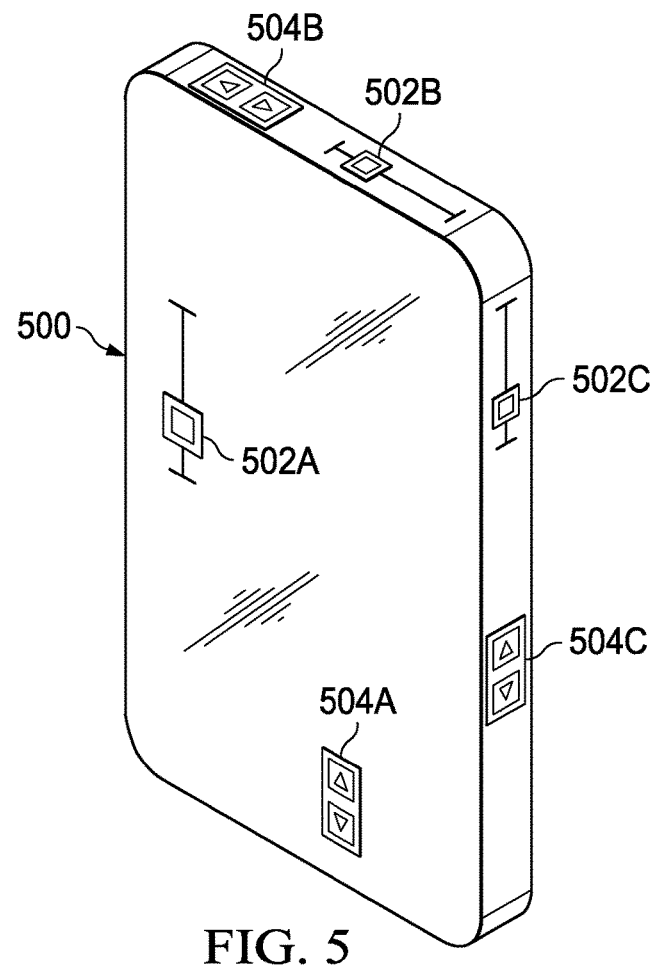
FIG. 5 illustrates multiple examples of where controls for different functions can be located.

FIG. 5 illustrates an example of placement of controls for different functions in one embodiment. As already discussed, the adaptive enclosure 500 can have touch sensor arrays on up to all six sides. In the embodiment of FIG. 5, the adaptive enclosure also has displays on all of those sides (e.g., capacitive touch screen displays as described later). In an alternative example, less than all six sides have displays, although all six sides have capacitive touch sensor arrays. Volume controls 502A-C and play (forward/reverse) controls 504A-C can be present in any number of locations. Three separate locations are shown in FIG. 5 for each control: 502A and 504A being on the front of the device, 502B and 504B being on the top of the device, 502C and 504C being on a side of the device.

A display can be located around the edges of the mobile device. Such a device can have up to four available edges, and displays can be selectively placed on one or more of the edges. In one embodiment, these displays are LCD displays in the form of a strip. The displays can show text and simple graphics. For example, the edge display can show stock quotes or a stock ticker, a weather report including current temperature, chance of rain, humidity, sunrise time, sunset time, wind speed, etc., a Tweet, an email, or the current time.

The edge display can also display a customized color or image. This display can lead to personalization of the mobile device. In other embodiments, such display can change the color based on occasion or even animate when a call comes through.

The edge display can also be touch-enabled and show UI components such as buttons, sliders, etc., such as volume controls 502B, 502C and play controls 504B, 504C. In one such example, the edge display can be used to move the display to view more details.

In another example, when the device is turned off, if a call comes through, an edge display alone can show the telephone number from which the call is received, as well as soft buttons for accepting or rejecting the call. The main display can remain off if in a same state as before the call was received.

To enable a touch feature, electric field sensing (EF) technology can be utilized. The EF technique utilizes the change in an electric field introduced by the presence of an object between receiver and transmitter electrodes. An AC signal applied to a transmitter electrode induces an AC current in the receiving electrode. This current can be amplified and processed for usage. When a third object comes near, it alters the current reaching the receiver. If the object is grounded, it will reduce the induced current; if it is floating, it will increase the current.

Thus, the display itself can be simple and thin as the display will not require the touch feature to be built into the display itself.

Another usage model is for the edge display to be added to the main display. The issue with just one main screen is that, if an operation requires the entire screen, and a simple task is to be performed, the currently running app has to be removed from the screen to perform the simple task and then the original app has to be restarted. For example, suppose the user is watching a movie and needs to quickly check weather or a current temperature. Instead of stopping the movie, checking the temperature and then restarting the movie, the edge display can quickly be checked for the temperature without leaving the movie playback.

The side edge display can display and control a volume level while a front touchscreen displays a video without the volume controls overlaying the video. This side edge display helps make the control seamless and prevents clutter on the main display. For example, the side edge display can display a volume slider along an edge of the device, such as 502B, 502C.

Media control buttons such as play/pause, seek, fast forward, back, etc., can be implemented on the edge display, freeing up the main display. This implementation can prevent a finger from blocking the front display while manipulating these controls.

Although FIG. 5 shows 502B and 502C occupying a portion of the side edges, the edge display can cover the entire side edges.

Thus, some implementations can be used to build mobile devices that save power, are highly customizable, and add features to the main display.

Further, the edge display can be used for enhanced security. For example, for payments, a unique code can be displayed on the edge display which can be inserted into a slot to identify the device and help secure payments.

In some embodiments, the display on the front of the device translucently shows UI controls that are on the back of the device. Thus, a user can interact with a backside control by touching a finger to the back side of the device, yet an image of the control, for visual acuity, is displayed on the front side of the device. Specific implementation details of such a translucent control are discussed below.

The locations at which these types of controls are located in FIG. 5 are purely examples and are based on how a user is holding the adaptive enclosure device at a given time or are based on the identification of a specific user holding the device. The adaptive enclosure can customize the location of the user interface controls for each user. These locations can be device-suggested customized locations from a histogram of how a given user holds the device or user-specified locations from a customization of a given application run on the system.

Figure 6:
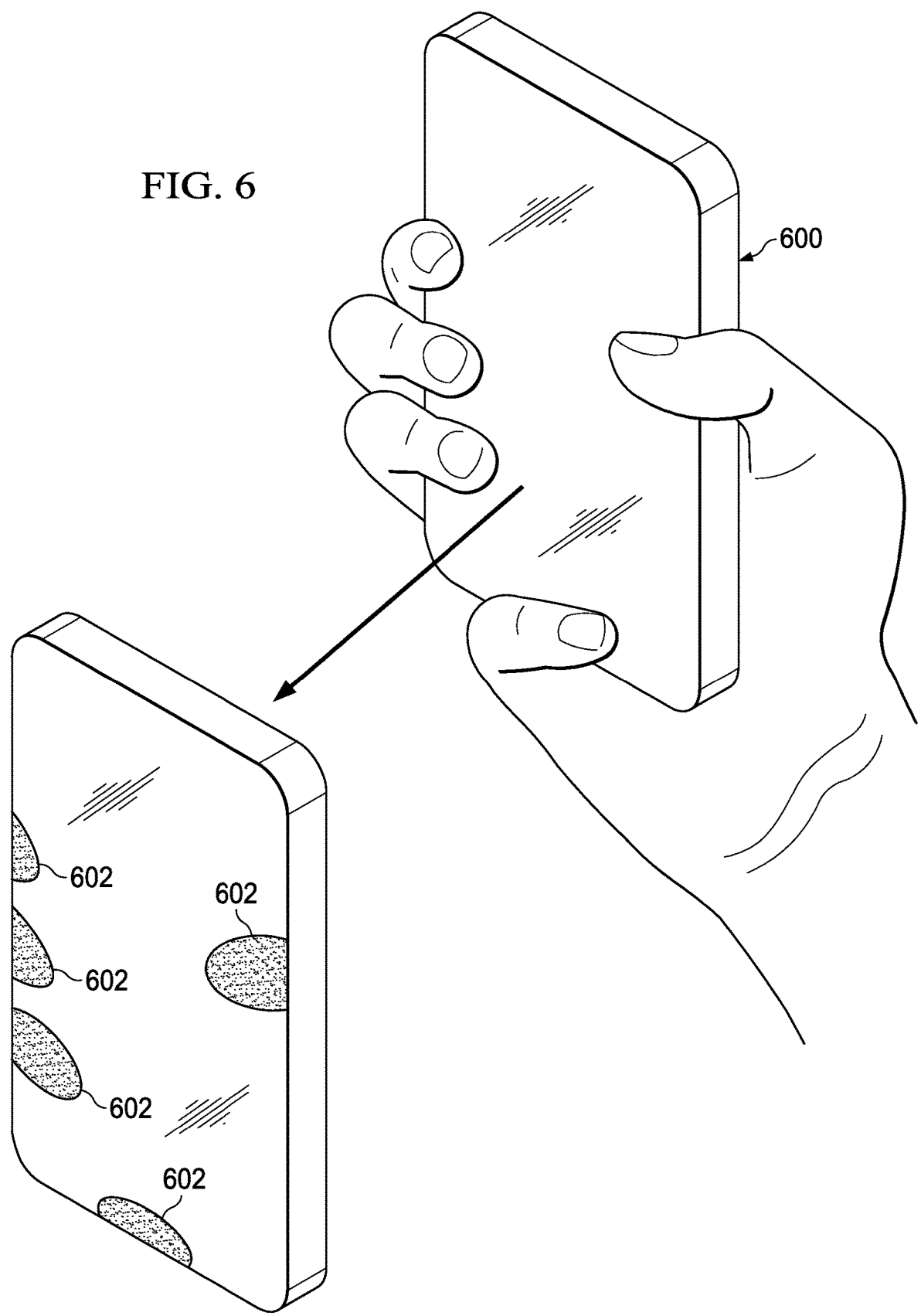
FIG. 6 illustrates an embodiment of how a given user can hold the adaptive enclosure device.

FIG. 6 illustrates an example of a user holding the adaptive enclosure device 600 with a right hand. Contact sensor data on the front of the device with spacing and patterns for fingers shown in pattern 602 or a similar pattern can indicate to grip detection logic 300 (in FIG. 3) that the user is holding the device for carrying purposes and not for interaction purposes. These types of patterns can also determine the handedness of the user. Although the contact sensor data is only shown affecting the front of the device, because the adaptive enclosure has sensor arrays on all six sides in many embodiments, the top, bottom, left, right, and back sides also can be used for grip pattern detection.

Figure 7:
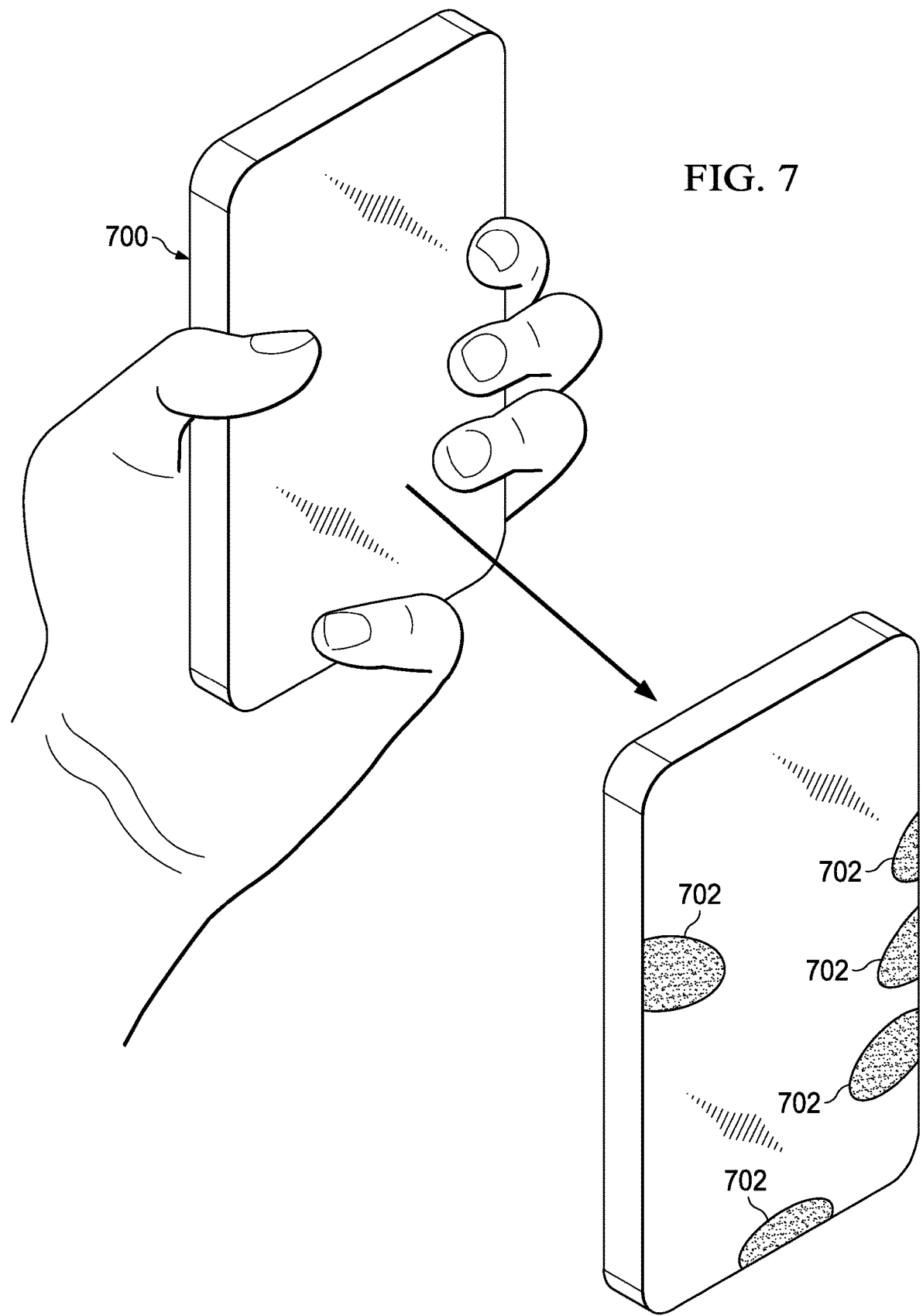
FIG. 7 illustrates another embodiment of how a given user can hold the adaptive enclosure device.

FIG. 7 illustrates another example, in which a user holds the adaptive enclosure device 700. FIG. 7 demonstrates a left hand grip with an opposite handed holding pattern 702 to that illustrated in FIG. 6.

Figure 8A:
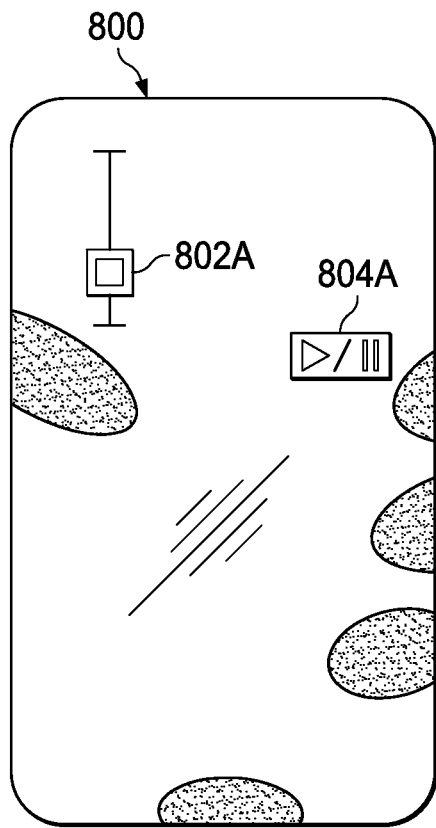
FIG. 8A and FIG. 8B show embodiments of alternative locations where buttons can be displayed based on hand grip location.
Figure 8B:
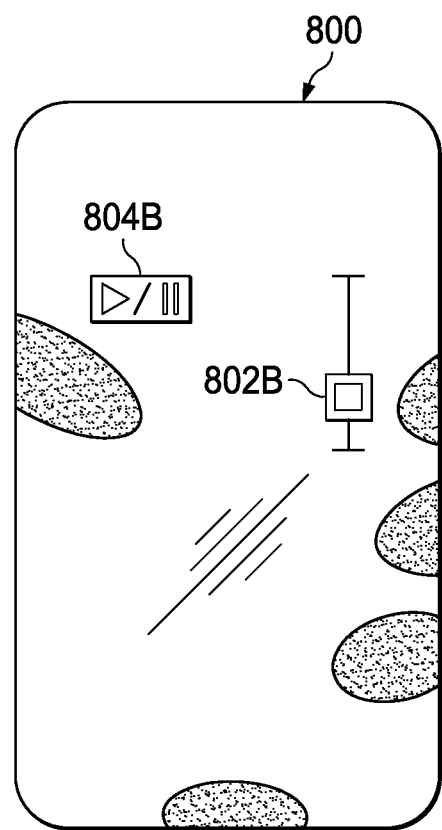

FIG. 8A and FIG. 8B show embodiments of alternative locations where buttons can be displayed based on a hand grip location. In FIG. 8A, the volume slider button 802A is placed near the thumb grip location upon a left hand grip of the adaptive enclosure device 800, whereas the play/pause button 804A is placed near the index finger grip location upon the left hand grip. Alternatively, in FIG. 8B, the buttons are reversed. Namely, the play/pause button 804B is placed near the thumb grip location upon the left hand grip of the adaptive enclosure device 800, whereas the volume slider button 802B is placed near the index finger grip location upon the left hand grip.

Grip suppression will now be explained in the context of an embodiment in which touch sensors on three continuous surfaces are perpendicularly joined together (the front, the left and the right). By detecting data from these three surfaces (e.g., in 3D space), the grip can be better detected. Of course, the device can include three standalone touch sensors or one single flexible touch sensor covering all three surfaces.

By detecting a finger touch in 3D space (e.g., the front, the left and the right side of the device), the grip suppression can be done more accurately and more easily.

For the current mobile devices, the HCI (Human-Computer Interaction) is limited to the touch screen in the front, while there are many possibilities for better HCI in 3D space (the front, the left, and the right side).

As one embodiment, the software could be based on three separate touch sensors. As another embodiment, it could be based on one unitary and continuous flexible touch sensor that wraps around the adaptive enclosure. The touch sensors on the left and right side can be as precise (e.g., in the case of one single flexible touch panel), or the side sensors can be less precise to save on component expenses.

It is not relevant whether the screen display is extended to one side (or two or more sides) of the device. However, if the screen display is extended to one side (or two or more sides) of the device, there could be extra features, e.g., visual feedback to grip suppression areas or a visual prompt for gestures performed on the side of the device.

Figure 9:
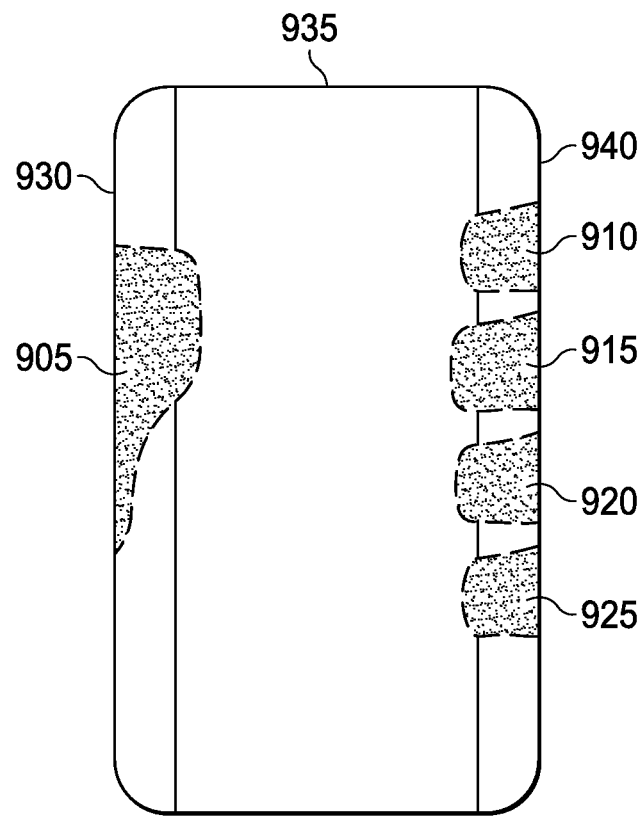
FIG. 9 shows a left hand gripping an adaptive enclosure device from behind, where the fingers project onto the side sensors of the device.

FIG. 9 shows a left hand gripping an adaptive enclosure device from behind, where the fingers project onto the side sensors of the device. When a user grabs the mobile device, the user's fingers contact the side touch sensors of the device, such as the left touch sensors 930 and the right touch sensors 940. Therefore, the finger projection on the left and right sides can be measured. Further, the fingers might also be in touch with the front touch sensor 935, with a projection that can be viewed as the natural spread from the side touch projection as shown in FIG. 9.

Sometimes, when the device is thick in depth, there will not be front touches for 910-925. However, when users are holding the device tightly or when users are stretching their thumb to reach something on the screen display, there is a good chance to have a front touch like 905.

Figure 10:
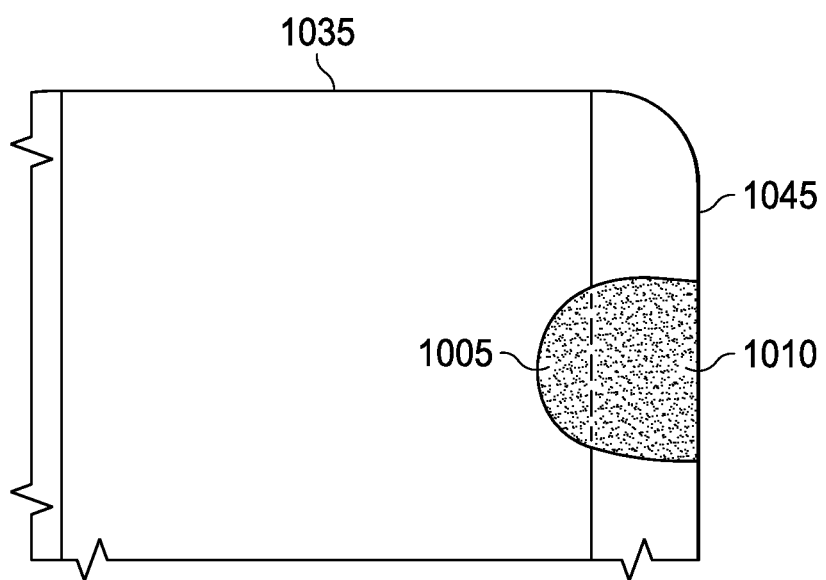
FIG. 10 shows how a finger projection area can be split into two areas.

FIG. 10 shows how a finger projection area can be split into two areas. Specifically, the whole finger projection area on touch sensors can be split into two areas:

Area #1: a finger projection 1010 on the side touch sensors 1045 of the device Area #2: a projection 1005 on the front sensors 1035 of the device that can be considered as the natural spread of Area #1.

The adaptive enclosure can determine that the edge touch 1005 connected to a related side touch, i.e., the "natural spread" part of the whole projection, is not a real touch-event and that the edge touch should be suppressed.

Figure 22:
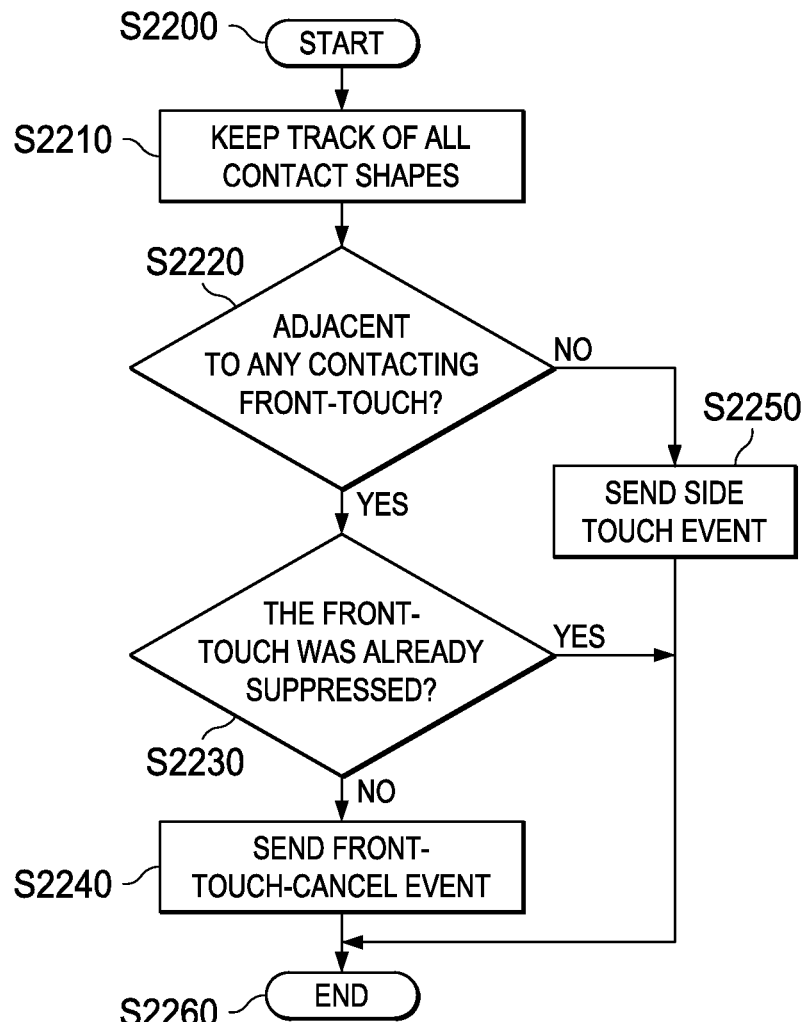
FIG. 22 shows an algorithm for a grip suppression interrupt routine for a side touch panel, according to one embodiment.

FIG. 22 shows an algorithm for a grip suppression interrupt routine for a side touch panel, according to one embodiment. The algorithm begins at S2200 and proceeds to S2210, at which the shapes made when fingers contact the sides of the adaptive enclosure are stored. The logic in the adaptive enclosure then determines at S2220 whether any of the side contact shapes are adjacent to a front touch. If there are no shapes adjacent to a front touch, the side touch event is considered valid and the side touch event is sent as input at S2250. The routine then proceeds to S2260.

If it is determined at S2220 that there are side contact shapes adjacent to a front touch, the routine determines whether the front touch was already suppressed at S2230. If the front touch was already suppressed, the interrupt routine proceeds to S2260. If the front touch was not already suppressed, then a front-touch cancel event is sent to suppress the front touch at S2240. The interrupt routine ends at S2260.

Figure 23:
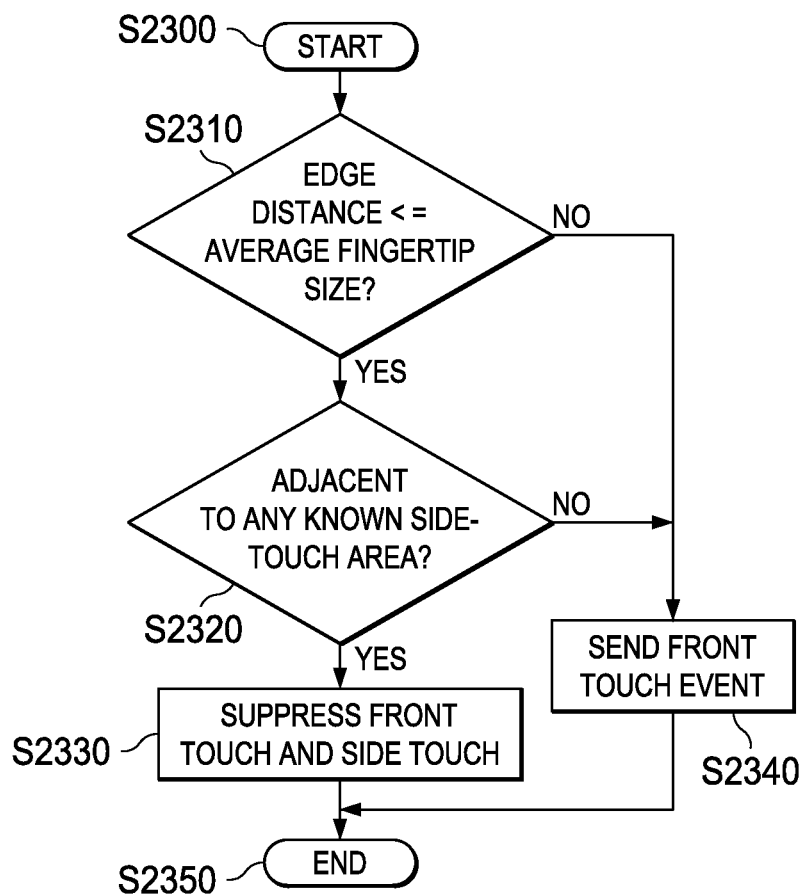
FIG. 23 shows an algorithm for a grip suppression interrupt routine for a front touch panel, according to one embodiment.

FIG. 23 shows an algorithm for a grip suppression interrupt routine for a front touch panel, according to one embodiment. The algorithm begins at S2300 and proceeds to determine at S2310 whether a distance from a front touch to an edge is less than or equal to an average fingertip size (e.g., 8-10 mm). If the edge distance is determined at S2310 to be greater (i.e., is not less than or equal to) the average fingertip size, then the algorithm proceeds to S2340. If it is determined at S2310 that the edge distance is less than or equal to the average fingertip size, then the adaptive enclosure logic determines at S2320 whether the front touch is adjacent to any known side touch areas.

If the front touch is determined at S2320 to not be adjacent to any known side touch areas, then the algorithm proceeds to S2340. At S2340, the front touch event is sent (e.g., considered a valid input and processed accordingly), and the interrupt ends at S2350. However, if the front touch is determined at S2320 to be adjacent to a known side touch area, then the front touch and the side touch are suppressed at S2330, and the interrupt ends at S2350.

By combining the previous two interrupt routines, touch points in the center of the front touch panel will trigger a normal touch event. Touch points near to the edge (e.g., where the distance to the edge is less than or equal to an average fingertip size) will trigger a normal touch event only if there is no adjacent side touch detected.

In one embodiment, if a user's finger contacts the front touch panel before the side touch panel, a touch-cancel event mechanism can recall the previously-sent touch event.

The FIG. 8 buttons illustrate simply one example of two alternative placement locations of buttons related to an application. For example, while a music application is playing music, this alternative placement can be one of many adaptation elements of the device. For example, a determination of user interface placement and functionality by the adaptive enclosure can be based on variables such as: time of day, identification of user, location of user, grip of user, velocity/acceleration of user, heart rate of user, etc. These variables can lead to a specific outcome of user interface placement and interaction sensitivity. Additionally, although hand grip details and button placement are simply shown on the front surface of the adaptive enclosure device 800, all sides of the device can be taken into account for UI placement as well as display elements shown on the device.

FIGS. 11A-11D illustrate another embodiment of an application interaction with a user. In this example, the user is running a camera application and raises the adaptive enclosure device 1100 for the purpose of taking a picture. In this example, assume the entire front surface of the device is displaying the view that would be captured in a picture. The user has his thumbs placed in a spaced-apart position on the front surface of the device. In some embodiments, holding the adaptive enclosure 1100 in a specific way in the context of having a camera application running will cause the UI to auto-populate the screen with camera control buttons.

Figure 11A:
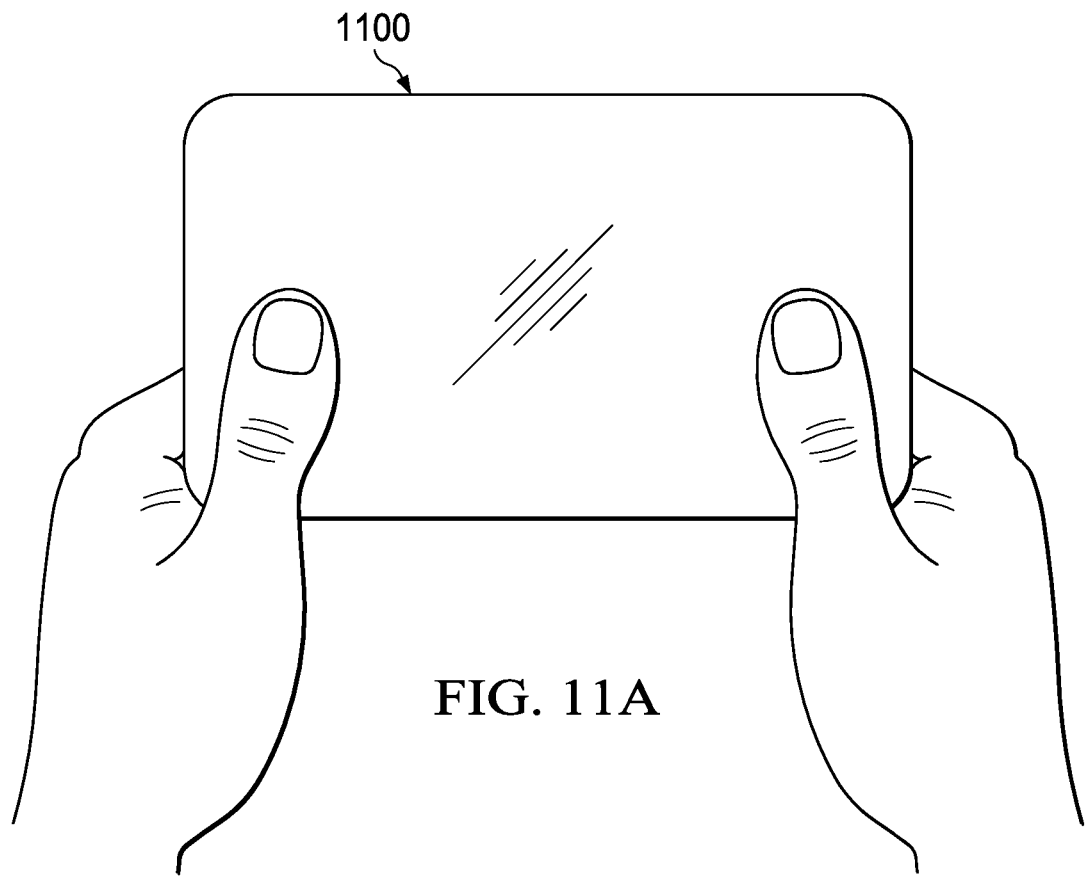
FIGS. 11A-11D illustrate another embodiment of an application interaction with a user.
Figure 11B:
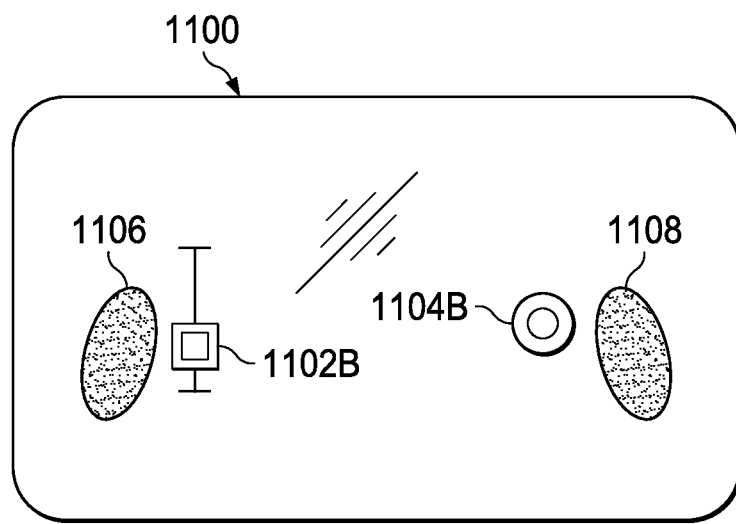

In FIG. 11B, the camera application, upon receiving thumb placement contact information from the front sensor array, places a zoom slider button 1102B right next to the left thumb location 1106 and places a picture capture button 1104B next to the right thumb location 1108. This placement can be determined based on calculated logic of the handedness of the user as well as historical use of the camera app by that particular user. On the other hand, the placement can also be user-defined.

Figure 11C:
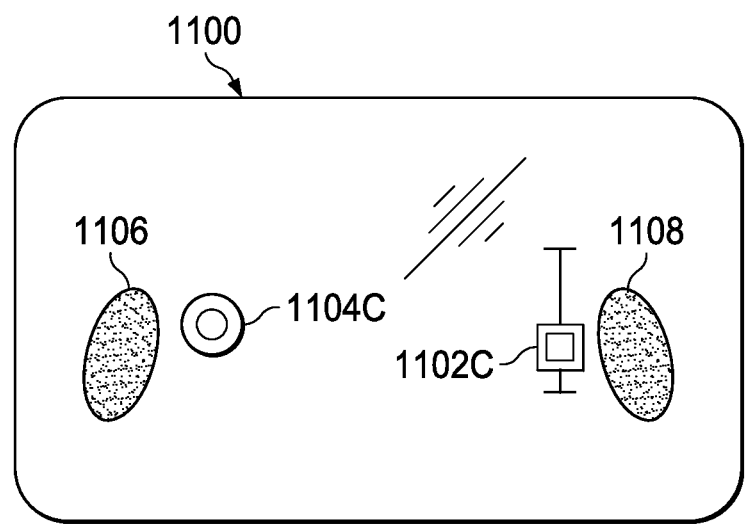
Figure 11D:
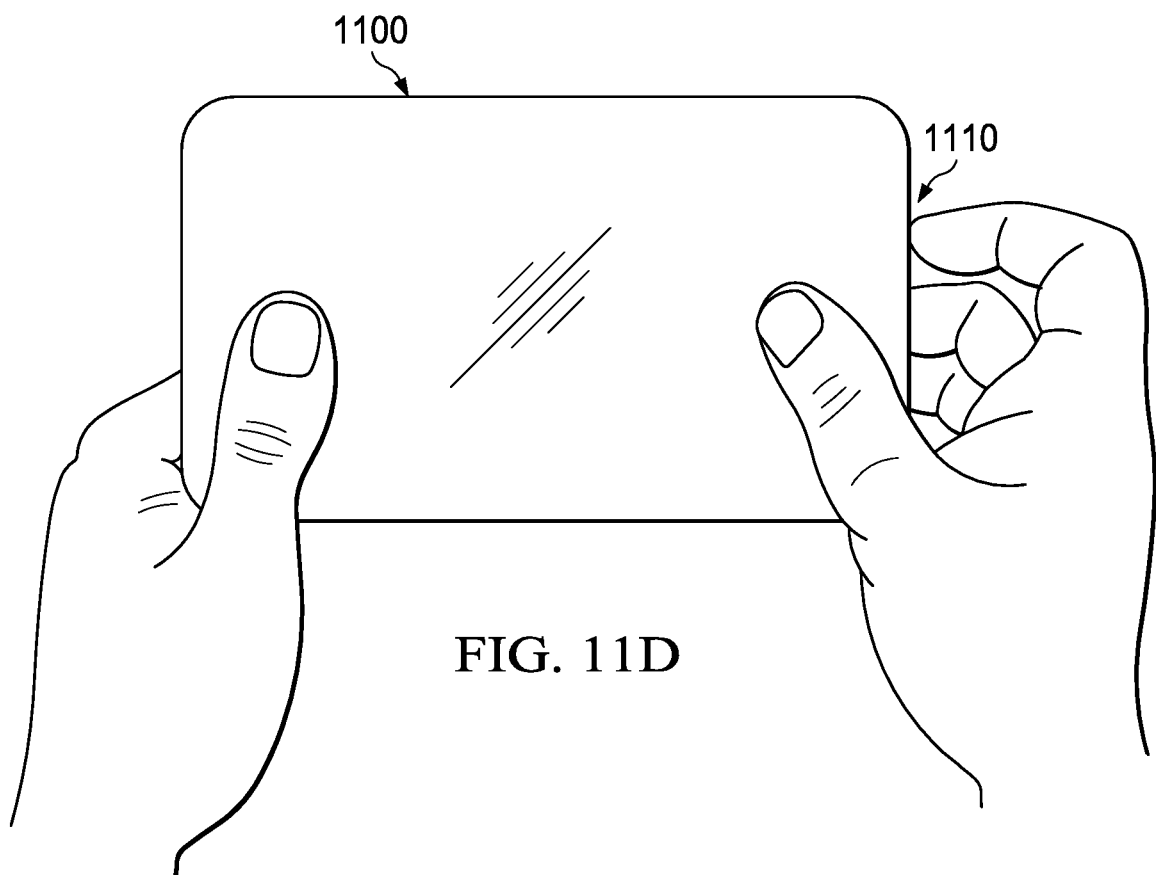

In FIG. 11C, the placement of buttons are reversed. Specifically, the picture capture button 1104C is placed near the left thumb location 1106, and the zoom slider button 1102C is placed near the right thumb location 1108. In an alternative embodiment, shown in FIG. 11D, there are no visible buttons to show on the adaptive enclosure device 1100. Rather, the user's right hand can simply tap the device on the side 1110 to capture a picture. A finger sliding on a side or front of the device (either up or down) can cause the picture or a preview to zoom out or in. Other instantiations of buttons (either displayed or not displayed) for functionality during such a camera application can be utilized, such as continuous shooting. In yet other embodiments, the adaptive enclosure logic 204 makes its own determination when to launch the camera application based on a number of factors, such as by interpreting conversations, pointing one side of the device (e.g., the back) towards a group of people while raising the device up to a user's eye level (e.g., as recognized by an opposing side camera), etc.

The adaptive enclosure logic (204 in FIG. 2) includes logic to determine a depression of the surface of a capacitive touch sensor from one pressure level to another pressure level in many embodiments. Once a user is identified based on grip/hold patterns, the adaptive enclosure logic 204 can continuously monitor those hand press locations on the surface. In many instances, this monitoring can indicate a finger is moving across the surface of the device or has been removed from the surface of the device or indicates that a greater deal of pressure is being placed by the hand/finger onto the surface.

Figure 12:
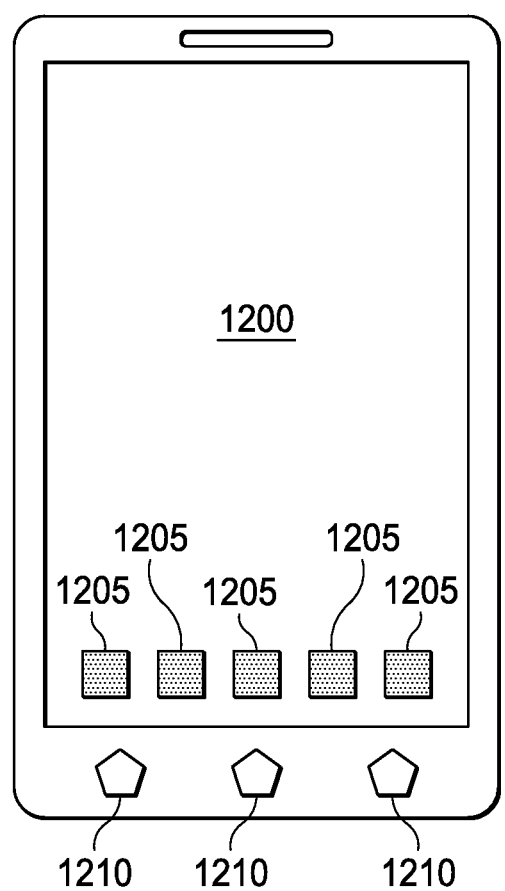
FIG. 12 shows an example of a horizontal hard button and soft button layout implemented in one embodiment when the adaptive enclosure is held with both hands.

FIG. 12 illustrates the normal layout of hard buttons 1210 and soft buttons 1205 of a mobile device when a user wants to control an application. FIG. 12 shows an example of a horizontal hard button and soft button layout implemented in one embodiment when the adaptive enclosure is held with both hands. Generally, the hard buttons 1210 are for commonly used operations, and the soft buttons 1205 are application-specific.

In the embodiment illustrated in FIG. 12, the buttons are laid out across display 1200 in a horizontal manner from left to right. This layout works fine when a) a user is holding the device with both hands, and b) a user is holding the device with one hand, but the other hand is available. However, when a user, especially one whose hands are small, is holding the device with one hand (e.g., the user is holding a bag with his left hand and is using his mobile device with his right hand), it can be difficult to touch the far-side soft/hard buttons, which brings about a less desirable user experience. This problem is exacerbated when a bigger display (often indicating a bigger device size) is used.

An adaptive button layout scheme equips a mobile system with sensors to detect whether the user is holding the device with both hands or one hand. If the device is held with just one hand, the sensors can also detect which hand is holding the device. This detection can be achieved as detailed previously or by adding a few pressure or temperature sensors on the device.

After the system gathers information about the hand or hands holding the device, the system can layout the soft buttons adaptively. For example, when the user is holding the device with both hands, the horizontal layout scheme illustrated in FIG. 12 is selected. When the user is holding the device with a right hand, the soft button layout should be right-hand-oriented so that all soft buttons are within reach of the right hand fingers (e.g., the thumb). The same principle applies when the user is holding the device with his left hand.

Figure 13:
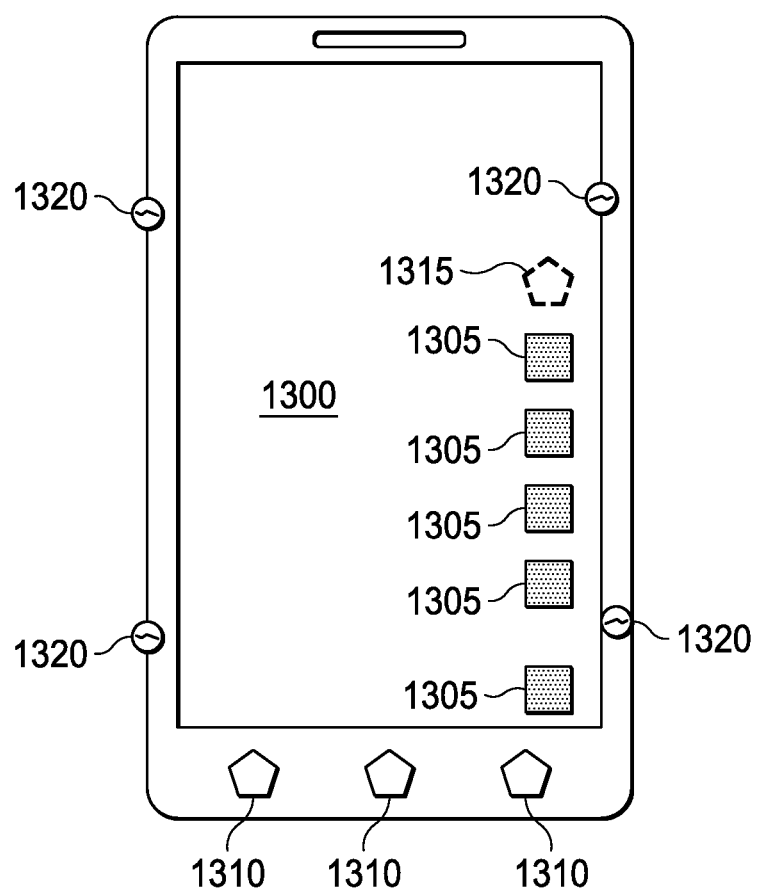
FIG. 13 shows an example of a vertical- and right-oriented soft button and emulated hard button layout implemented in one embodiment when the adaptive enclosure is held with a right hand.

FIG. 13 illustrates a scenario in which the adaptive enclosure is held by a user's right hand. In this scenario, a hard button 1310 distant from a user's hand (e.g., the leftmost hard button) is emulated as a soft button 1315 in the display 1300. Both the emulated hard button 1315 and soft buttons 1305 are displayed in a vertical column on the right side of the display 1300.

With sensors 1320 in the adaptive enclosure, a processor can determine that the adaptive enclosure is being held by a right hand. Thus, the processor can perform an adaptive switch of the button layout (e.g., between the horizontal layout of FIG. 12 and the vertical layout of FIG. 13) in a real-time manner.

When the user is holding the device with only one hand, the other hand might not be occupied. For example, some users like to hold the device with their right hand and touch the display with their left hand. In this case, a layout scheme change is not required. Thus, a user's input can be used to indicate a scenario where only one hand is available. One example embodiment uses a notification bar switch to add a "one hand mode" switch there. The user can thus operate the switch to indicate one-hand or both-hand modes.

Another way is to use a one-hand-oriented button layout when one-hand holding is detected and switch to both-hand mode when a touch that is out of the holding hand's reach is detected (implying the other hand is actually available). The layout will switch back to one-hand mode again when a touch out of the reach of the holding hand has not been detected for a threshold time.

Figure 14:
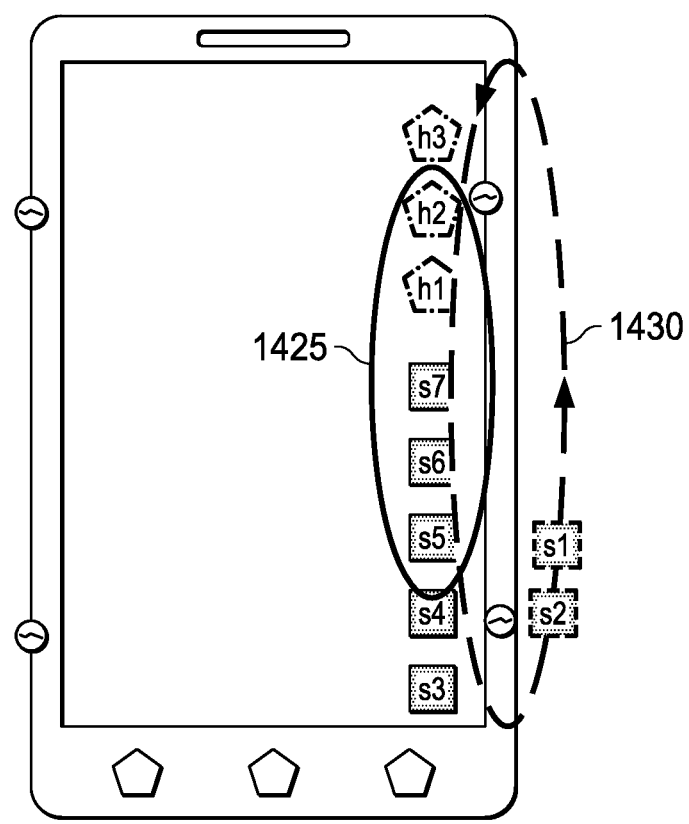
FIG. 14 shows an implementation of a button ring, including soft buttons and emulated hard buttons, in accordance with one embodiment.

Because the size of people's hands is different, some embodiments lay out the buttons for all hand sizes. One example solution is a button ring as illustrated in FIG. 14. FIG. 14 shows an implementation of a button ring 1430, including soft buttons and emulated hard buttons, in accordance with one embodiment. The button ring organizes the buttons for a one-hand scenario. The buttons can be scrolled in/out of the display and the button-push area (a subset of the displayed buttons) at the right side of the display and can be reached by a thumb of a hand of any size. The user uses his thumb to slide the ring to get a desired button in the button-push area 1425 and pushes the button to issue a command. FIG. 14 illustrates an example implementation for the adaptive enclosure being held by a right hand. In FIG. 14, soft button s1 and soft button s2 are scrolled out of the display, and soft buttons s3 and s4, as well as emulated hardware button h3, are displayed outside of the button-push area. Further, soft buttons s5, s6, and s7, as well as emulated hard buttons h1 and h2, are displayed within the button-push area. In some embodiments, s3 and s4 are only partially displayed or are displayed translucently or grayed-out to indicate they are outside of the button-push area.

This scheme does not increase the cost or the power consumption significantly. Temperature or pressure sensors to determine the hand holding the device are not expensive, and these sensors will only add a small percent to the total device cost. As for power, since the user will likely not change his holding manner frequently, the sensors can be switched off most of the time.

Figure 15:
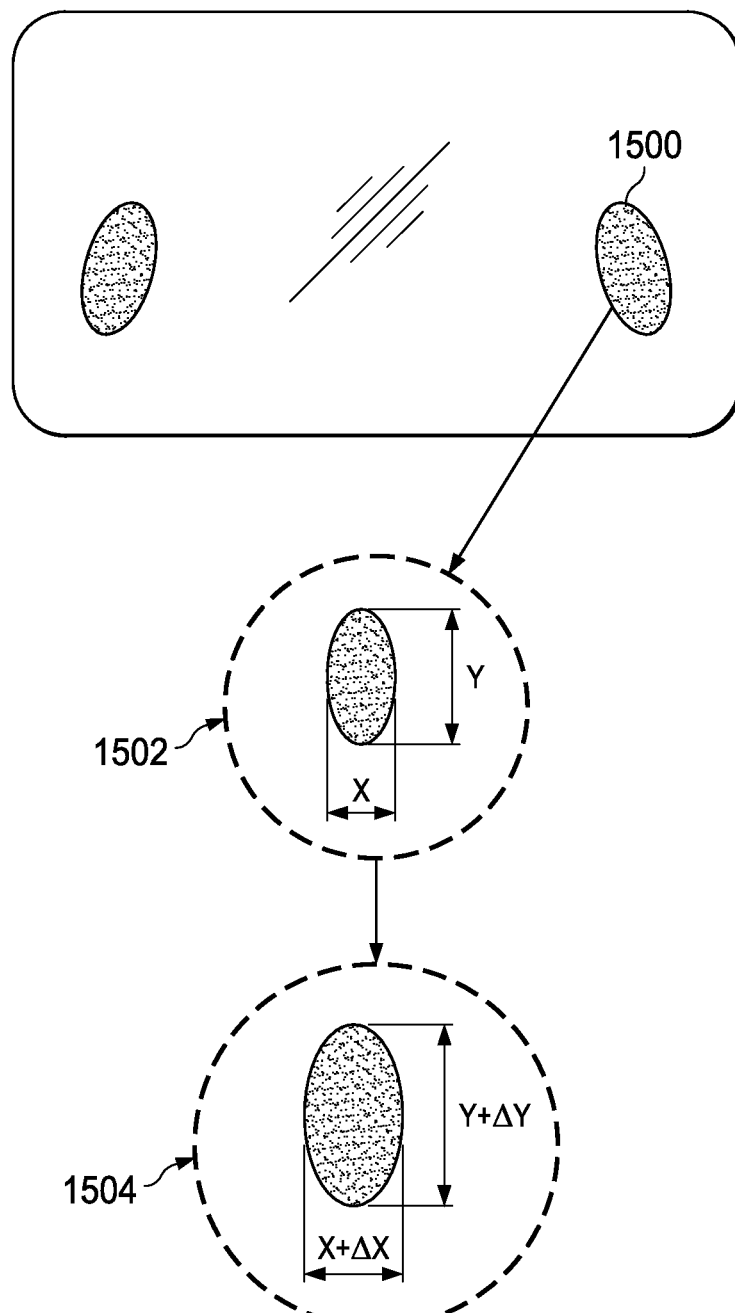
FIG. 15 illustrates an embodiment of a determinative algorithm for a change in contact point pressure on the adaptive enclosure.

FIG. 15 illustrates an embodiment of a determinative algorithm for a change in contact point pressure on the adaptive enclosure. There are several methodologies to determine such an interaction, including a measurement of a given surface contact area and a determination of a change between a standard contact area amount and a pressurized contact area amount. For example, if a fingertip is casually resting on the surface at location 1500, the fingertip contact point can be dynamically measured for an area of contact of the fingertip on the capacitive surface: a rudimentary surface approximation multiplies the biggest X width of the fingertip contact by the biggest Y height of the fingertip contact, shown in inset 1502. There are more complex and accurate measurement techniques that can be implemented.

Logic frequently updates this contact area, once it has been measured, to determine whether the user is pressing down more firmly, thereby increasing the area. This updating can be periodic, random, or can change based on, e.g., a magnitude of the pressure or a rate at which the pressure has recently changed. In calculation 1004, the changed width X+ΔX and the changed height Y+ΔY create a new area that is compared by the logic with the earlier area to see a changed area. If the changed area surpasses a threshold amount, the adaptive enclosure logic 204 can interpret the difference as a specific finger press to indicate a function result. For example, a user might have his thumb on a portion of a surface of the device to hold the device in place in a picture mode. Then the user exerts an amount of force on his thumb to press into the screen. The adaptive enclosure logic 204 can determine that a picture capture event is to take place based on the change in area of the fingertip.

The example in FIG. 15 simply shows a single fingertip contact area. In other embodiments, all contact locations for a hand are measured (fingers, palm, etc.), and the same area calculations take place on all sides of the device. If a significant gripping force increase takes place, the adaptive enclosure logic (potentially specifically the grip detection logic 300) can determine that a user-specific interaction with the adaptive enclosure is taking place. This interaction can be in the form of a squeeze event. In many embodiments, such a squeeze event can replace a home button that is or would otherwise be physically on the device. In some embodiments, the logic can determine squeezing gestures based on an area of hand contact change, as discussed above. In other embodiments, the logic and pressure sensors within the device can determine a squeeze event being exerted on the external structure of the device without requiring an area calculation by basing such determination on a change in pressure or temperature.

Figure 16A:
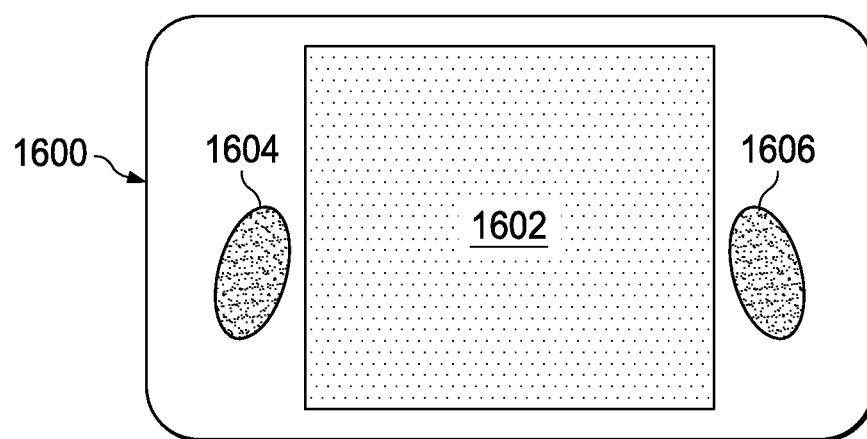
FIGS. 16A, 16B, and 16C describe an embodiment of the user holding the device and the thumb contacts.
Figure 16B:
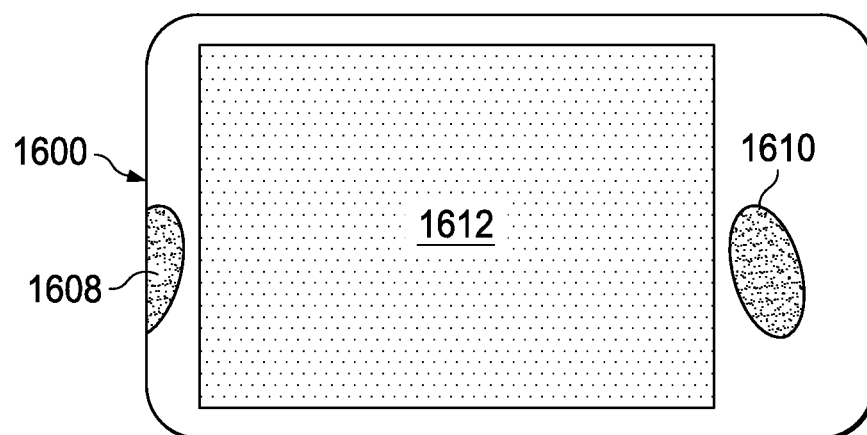
Figure 16C:
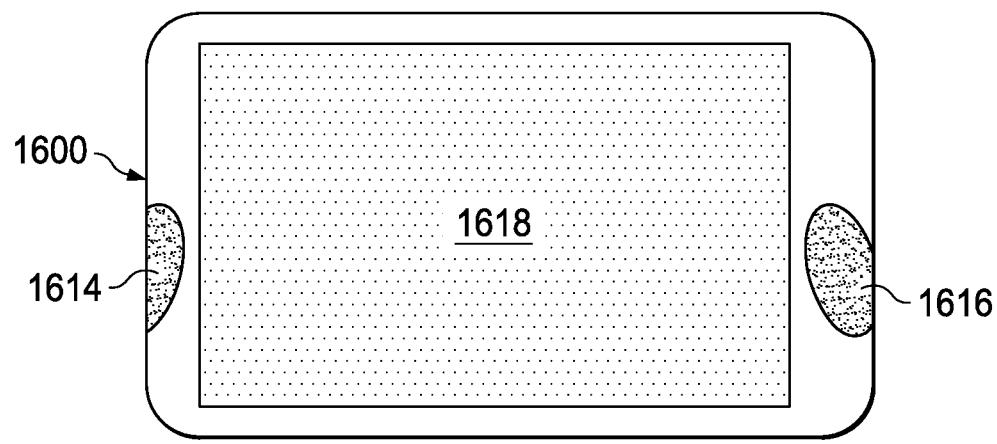

As discussed in FIG. 11A-11D, when a graphical picture is displayed on a surface of the adaptive enclosure device (e.g., a view from an integrated camera to set up a picture), the picture was described as shown across the entire surface of the front side of the device. In other embodiments, the picture shown can adapt to the way in which the user is holding the device. FIGS. 16A, 16B, and 16C describe an embodiment in which the user holds the device, the thumb contacts the device, and the visual display of what is seen by the camera dynamically adapts to not obscure the view of the picture with the thumb placements.

In FIG. 16A, the thumb placement contacts 1604 and 1606 are in the same placement on the front side of the adaptive enclosure 1600 as they are in FIG. 11A. In this scenario, the logic adapts the display screen 1602 to fit between the two thumbs.

In FIG. 16B, thumb placement contact 1608 has moved left to be only partially on the edge of the front side of adaptive enclosure 1600, while thumb placement contact 1610 is in the same placement on the front side. In this scenario, the logic adapts the display screen 1612 by expanding it to the left (in relationship to the size of the screen 1602) to create a bigger image. This expansion can be by way of expanding the ratio of display pixels per photo pixel or by maintaining the ratio and displaying pixels corresponding to additional photo pixels.

In FIG. 16C, thumb placement contact 1614 has stayed in the same place relative to FIG. 16B, but thumb placement contact 1616 has moved right to be only partially on the edge of the front side of adaptive enclosure 1600. In this scenario, the logic adapts the display screen 1618 by expanding it to the right (in relationship to the size of the screen 1602 and screen 1612) to create an even bigger image.

Figure 16D:
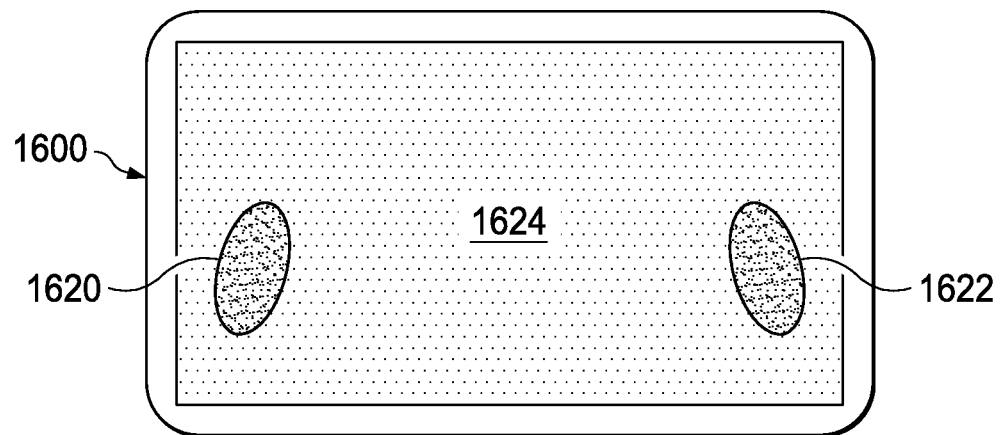
FIGS. 16D and 16E describe an embodiment of the adaptive enclosure logic allowing for the display screen to be covered by certain fingertip contact points.
Figure 16E:
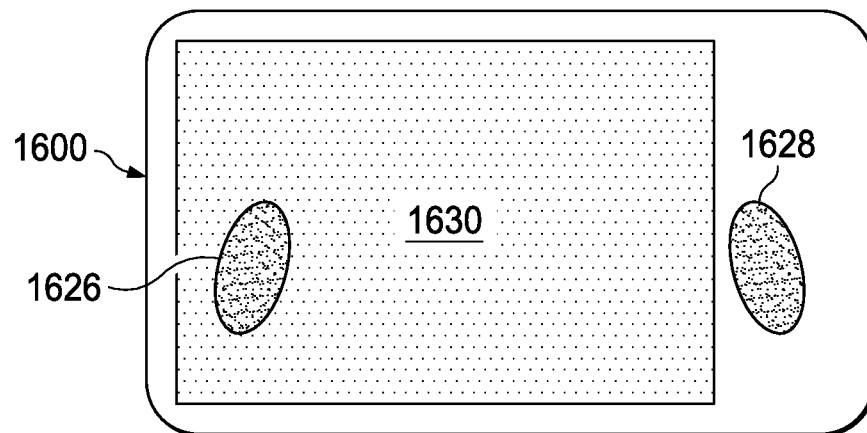

FIG. 16D and FIG. 16E describe an embodiment of the adaptive enclosure logic allowing for the display screen to be covered by certain fingertip contact points. For example, in FIG. 16D, the logic allows for portions of the screen 1624 to be covered by both left and right thumb placement contacts 1620 and 1622. In FIG. 16E, the logic allows only for left thumb contact point 1626 to cover a portion of display screen 1630, while keeping right thumb contact point 1628 clear of the screen. Accordingly, the adaptive enclosure logic shrinks the right side of display screen 1630 to compensate. In some embodiments, whether the left or right thumb contact point is cleared of the screen is based on the handedness of the user, which can be determined by a user input or by learning algorithms within self-learning logic (210 in FIG. 2). In some embodiments, the zoom, picture capture control (discussed above), and any number of other functional buttons are displayed in the non-display screen area (such as the area around thumb contact point 1628 in FIG. 16E).

Figure 17A:
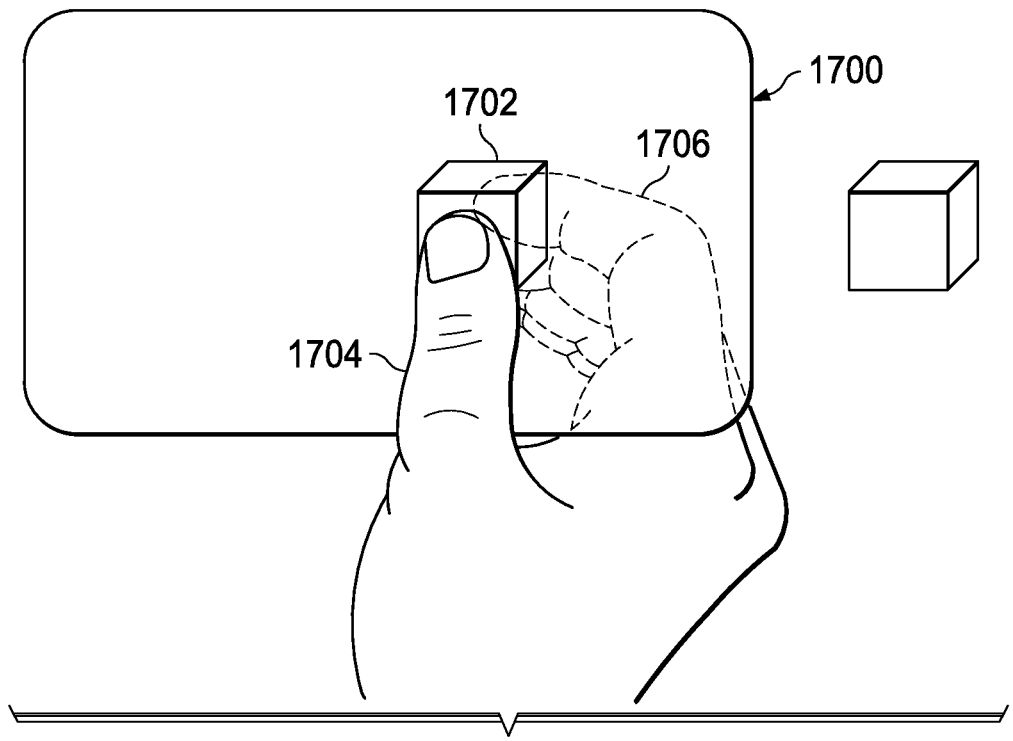
FIGS. 17A and 17B describe an embodiment of interaction with a 3D object using the adaptive enclosure device.
Figure 17B:
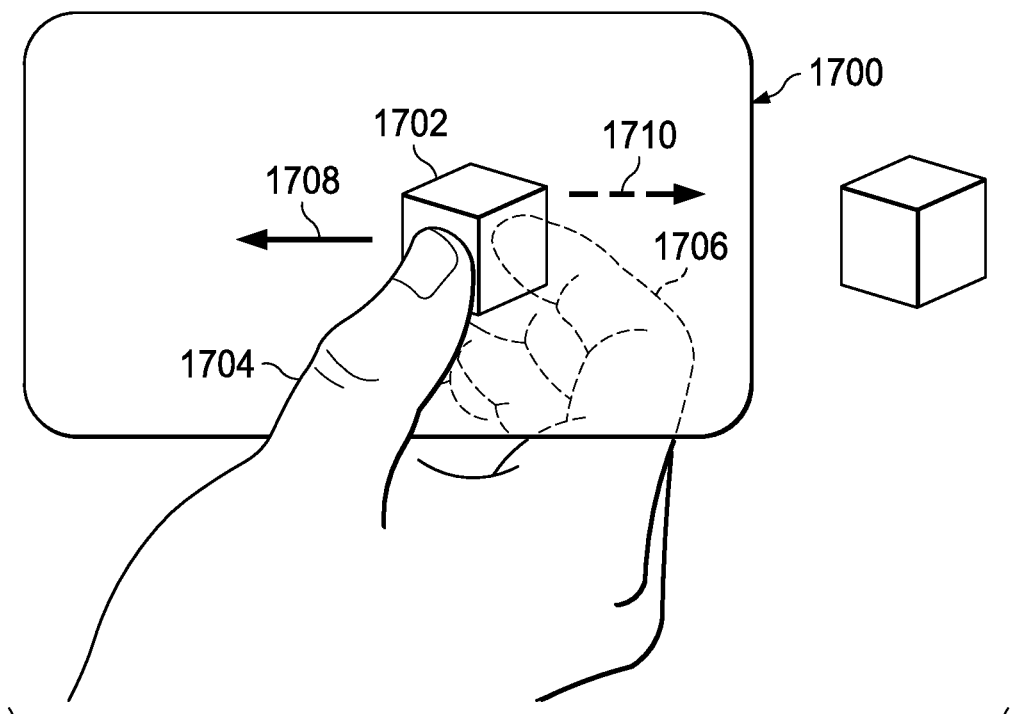

FIG. 17A and FIG. 17B describe an embodiment of interaction with a 3D object using the adaptive enclosure device 1700. In FIG. 17A, a cube 1702 is shown displayed on the front display of the adaptive enclosure device 1700. A copy of the cube is also shown to the right of FIG. 17A for a non-obstructed view. The cube 1702 is displayed in a 3D space within the device. In many embodiments where there is also a display on the back side (not shown) of the adaptive enclosure device 1700, the same cube can be seen from the other direction. A user can press a first finger 1704 (the thumb in this example) on the front of the device and a second finger 1706 (the index finger, shown with dotted lines because the adaptive enclosure device would be obscuring the finger) on the back of the device, as shown in FIG. 17A.

When the first and second fingers 1704, 1706 are placed on the surfaces of the adaptive enclosure device, the adaptive enclosure logic can determine the gesture is meant to select the object in 3D space, which can unlock a 3D object rotation feature. For example, if the user simply contacts the device with the first finger 1704 on the front side of the device, this contact can alternatively unlock a 3D object movement feature. As an example of such a feature, the object attaches to the finger contact and moves around the screen under the user's first finger 1704 as he slides his first finger 1704 around the screen. On the other hand, if the object selection contact is with two fingers, on the front side (e.g., with finger 1704) and on the back side (e.g., with finger 1706) then the 3D object rotation feature can be selected.

With the 3D object rotation feature, as shown in FIG. 17B, the user moves/slides/swipes the first finger 1704 in one direction 1708 and moves/slides/swipes the second finger 1704 in the opposite direction 1710. This front and back side simultaneous movement at adaptive enclosure surface points in contact with the front and back side of the cube 1702 can cause the cube to rotate (as seen in the cube 1702 perspective difference between FIG. 17A and FIG. 17B) in a similar direction as if the cube were a real object and the user was pinching the cube and moving his fingers in the same manner.

As can be seen in FIG. 17A and FIG. 17B, the user can estimate where his second finger 1706 comes in contact with the back side of the adaptive enclosure device. The finger is shown in a dotted line, but in a real-world scenario, would not necessarily be so shown because the device would obscure the finger.

FIG. 18A-18D illustrate a backside pointer implementation for the adaptive enclosure device to allow for a more precise back side pointer contact location. The backside pointer allows for a helpful pointer system so the user knows where his finger(s) is located.

For certain applications, a virtual pointer or cursor can be created and displayed upon a determination that a finger is within a predefined range of the back side surface of the adaptive enclosure device. This range is sometimes considered solely in the depth direction of the adaptive enclosure device, but some embodiments also consider ranges in the length or width directions of the device. The distance that a finger is tracked can depend on the sensitivity of the capacitive sensor array on the back side of the device. In certain embodiments, the sensitivity of the readings of the capacitive sensor array on the back side of the device is increased in applications where a backside pointer is utilized. Additionally, the finger tracking mechanism for the backside pointer can also utilize other sensors and/or a camera in the device in addition to the backside capacitive sensor array.

The virtual pointer can be in the form of a circle. The size of the circle can be a function of the distance from the finger to the back side surface of the device. When the finger moves closer to the back side surface, the pointer circle becomes smaller. In many embodiments, when the finger finally makes contact with the back cover, the pointer resolves to a minimum size to pinpoint the smallest objects displayed on the screen. Of course, the virtual pointer can take other shapes, such as an oval (or fingerprint), a rectangle, a triangle, a star, or any other shape.

This backside pointer implementation can be used for clicking on the back side of the device when the virtual pointer locates an object to click on. The user can move his finger away after the pointer finds the clickable object. In different embodiments, the click operation launches an application, selects a menu item, clicks on a link to a web page, etc., in a manner understood by the skilled artisan.

FIG. 18A-18D show two separate viewpoints of a single backside pointer interaction. The left side of each figure shows the display screen on the front side of the adaptive enclosure device 1800. The right side of each figure shows a side view of the adaptive enclosure device and a finger approaching the rear side of the device.

FIG. 18A shows how the backside pointer can begin operation. At a certain distance from the back surface 1802, for example a distance X, the adaptive enclosure device 1800 picks up the proximate location of the finger and displays a form of a circle 1806 on the front side display. In some embodiments, this type of pointer interface is only available when running certain applications on the adaptive enclosure device 1800.

Additionally, the adaptive enclosure logic can interpret several fingers on or near the back side of the device and determine which of those fingers is a certain finger used for a backside pointer operation. For example, using grip detection logic, the device can automatically eliminate other fingers from consideration when determining the display of the backside pointer.

Figure 18C:
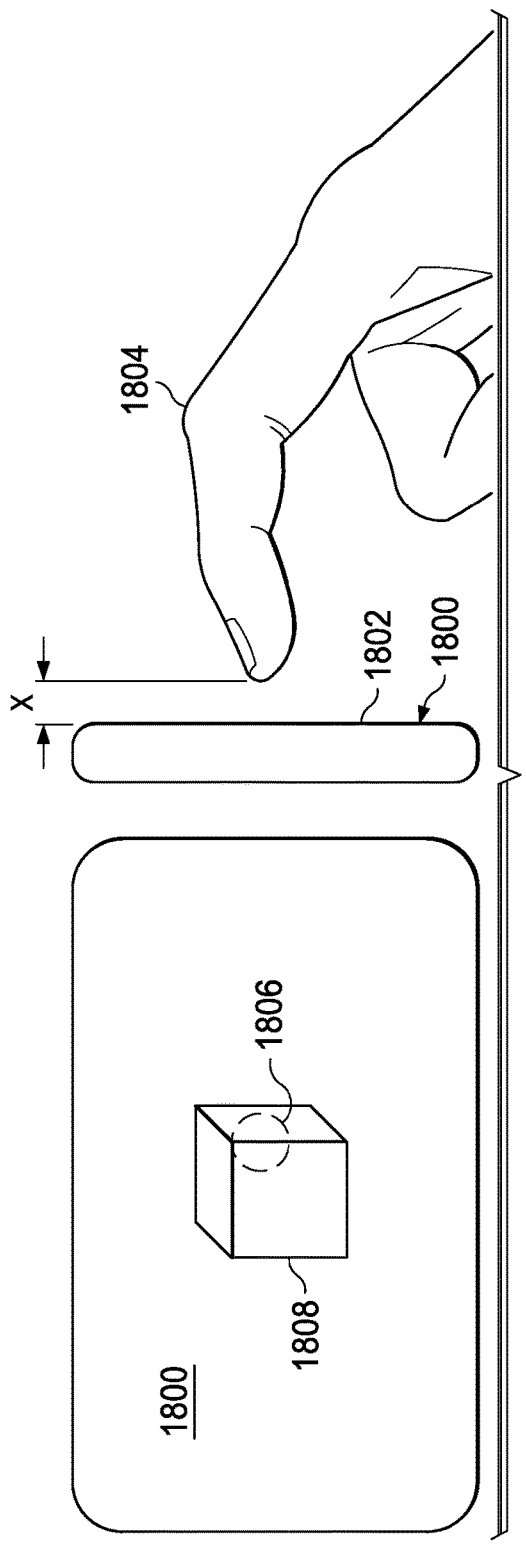
Figure 18D:
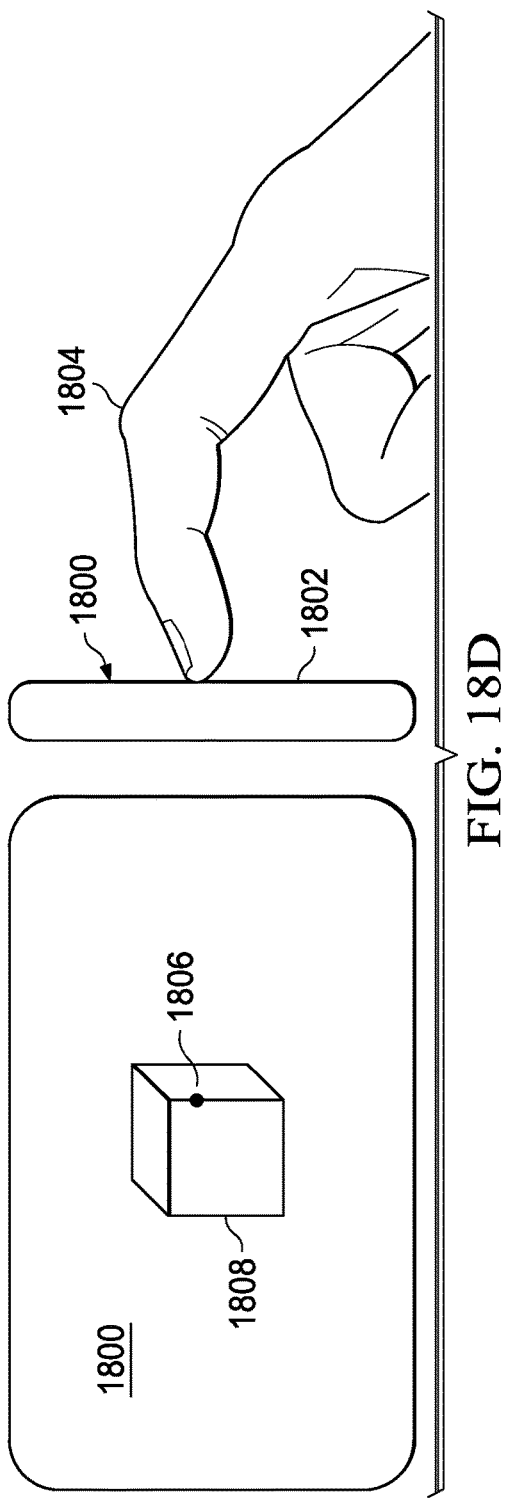

As stated, the further away from the device the user's finger 1804 is, the larger the pointer circle is. As the finger approaches the back side surface, as shown in FIGS. 18B, 18C, and 18D, the pointer circle narrows in circumference until the finger is in contact with the surface of the device and the pointer selection area is quite minimal. In many embodiments, this allows the user to guide his finger to the correct location to select and interact with an object, such as cube 1808, which is shown along with the backside pointer circles, on the front side display of the adaptive enclosure device 1800.

The adaptive enclosure can allow a user to touch and to move a cursor of an application without the user's finger blocking the target point on the front screen.

Figure 19:
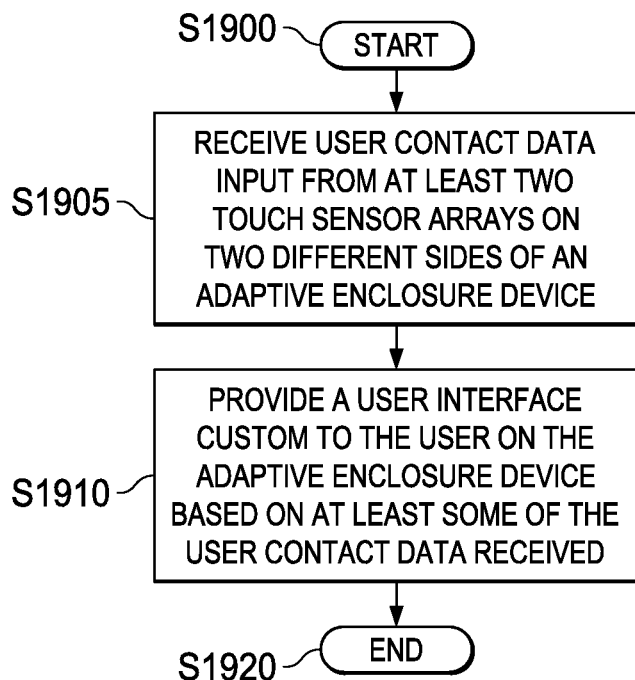
FIG. 19 is a flow diagram of an embodiment of a process to provide a custom user interface on the adaptive enclosure device.

FIG. 19 is a flow diagram of an embodiment of a process to provide a custom user interface on the adaptive enclosure device. The process is performed by processing logic that can be located in hardware, software, firmware, or a combination thereof.

The process begins at S1900 and proceeds to S1905 at which the processing logic receives user contact data input from at least two touch sensor arrays on two different sides of an adaptive enclosure device. In many embodiments, more than one array on more than one side of an adaptive enclosure device is utilized. In other embodiments, a single array on one side of the adaptive enclosure device is utilized. In yet other embodiments, a single array that spans more than one side of the adaptive enclosure device is utilized.

The process continues with the processing logic providing, at S1910, a user interface custom to the user on the adaptive enclosure device based on at least some of the user contact data received at S1905. In many embodiments, context information (e.g., time of day, ID of user, outside temperature, amount of sunlight hitting the device, heart rate of user, location of device, speed relative to the ground of the device, acceleration of the device, presence of other devices in the vicinity of the device, application(s) active on the device, presence of other people in the vicinity of the device, ambient noise near the device, etc.) is used in addition to the contact data input from sensor arrays on the device to help with determining the custom UI. The process concludes at S1920.

Figure 20:
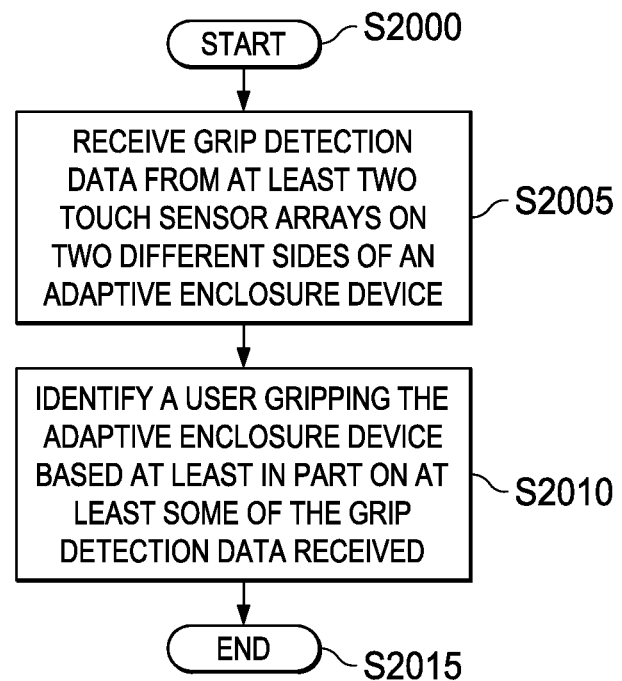
FIG. 20 is a flow diagram of an embodiment of a process to identify the user of the adaptive enclosure device through the use of grip detection logic.

FIG. 20 is a flow diagram of an embodiment of a process to identify the user of the adaptive enclosure device through the use of grip detection logic. The process is performed by processing logic that can be located in hardware, software, firmware, or a combination thereof.

The process begins at S2000 and proceeds to S2005 at which the processing logic receives grip detection data from at least two touch sensor arrays on two different sides of an adaptive enclosure device. Again, although this particular process utilizes at least two arrays for input, in other embodiments, there is only one array involved (e.g., on a single side of the device or one array being present on multiple sides of the device). Furthermore, the grip detection logic can also utilize other adaptive enclosure logic, such as back, side, or front touch gesture logic.

The process continues with the processing logic identifying at S2010 a user who is gripping the adaptive enclosure device, based at least in part on at least some of the grip detection data received. In many embodiments, the identification is based on a stored database of past grips. Grips of certain users can be initially identified through training or general usage over time. The adaptive enclosure device logic can simply train itself through normal use by one or more users. Once a large enough data set is present to make grip comparisons against, the logic can intelligently determine the user based on a similarity of grip. Of course, a dedicated training application can also be implemented. The grip, as discussed above, includes data related to the side of the fingers/palm, the pressure of the grip, the spacing of the contact points, etc.

Figure 24:
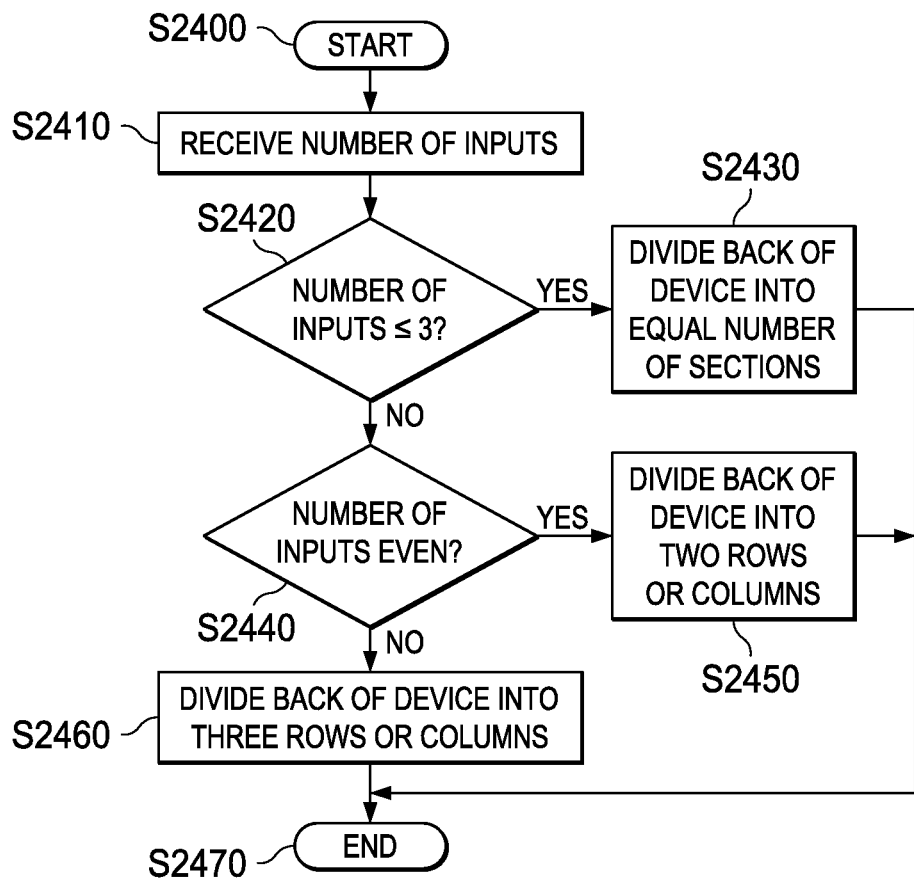
FIG. 24 shows an algorithm for determining how positions on a back sensor are mapped to a requested number of inputs.

FIG. 24 shows an algorithm for determining how positions on a back sensor are mapped to a requested number of inputs. For example, the algorithm can be used to divide the sensor array on the back of the device into a number of inputs requested by different video games. The algorithm begins at S2400 and proceeds to S2410. At S2410, a number of inputs is received from an app, such as a video game.

At S2420, it is determined whether the number of inputs is less than three. If the number of inputs is less than three, then there is sufficient room for each of the portions to extend across the entirety of the back sensor. Thus, if the number of inputs is determined to be less than three, the algorithm divides the back sensor into a number of columns or rows equal to the number of inputs at S2430. Thus, if only one input is required, the entire back sensor can be used as a button triggering that input. If only two inputs are required, then the back sensor can be divided into two approximately equal portions, such as by bisecting the length of the sensor. This bisecting permits a user to use his or her index fingers to activate the appropriate button. If three inputs are requested, then the back sensor is divided into three approximately equal portions. This division permits a user to activate a button with his or her middle finger.

If it is determined at S2420 that the number of inputs is not less than or equal to three (i.e., is greater than three), then it is determined if the number of inputs is even at S2440. If it is determined at S2440 that the number of inputs is even, then, in one embodiment, the back sensor is divided into a grid having two rows and a number of columns equal to half the number of requested inputs at S2450. For example, if six inputs are requested, then the back sensor has two rows and three columns. In another embodiment, the number of columns is equal to two, and the number of rows is equal to half the number of inputs.

If the number of inputs is determined at S2440 not to be even (i.e., is odd), then the back sensor is divided at S2460 into three rows, in one embodiment. The outer two rows are then divided into a number of columns equal to half the number of requested inputs, rounded down. The middle row is then used as a single input. In another embodiment, the back sensor is divided at S2460 into three columns, where the outer two columns are divided into a number of rows equal to half the number of requested inputs, rounded down. In a further embodiment, the middle row (or column) is used for more than a single input.

The algorithm concludes at S2470.

Once the back sensor has been divided into an appropriate number of sections, control is returned to the requesting app. In some embodiments, the app will assign inputs (e.g., the activated weaponry described in Table 1) to the sections. In other embodiments, the app will allow a user to map each section to a different input.

Figure 21:
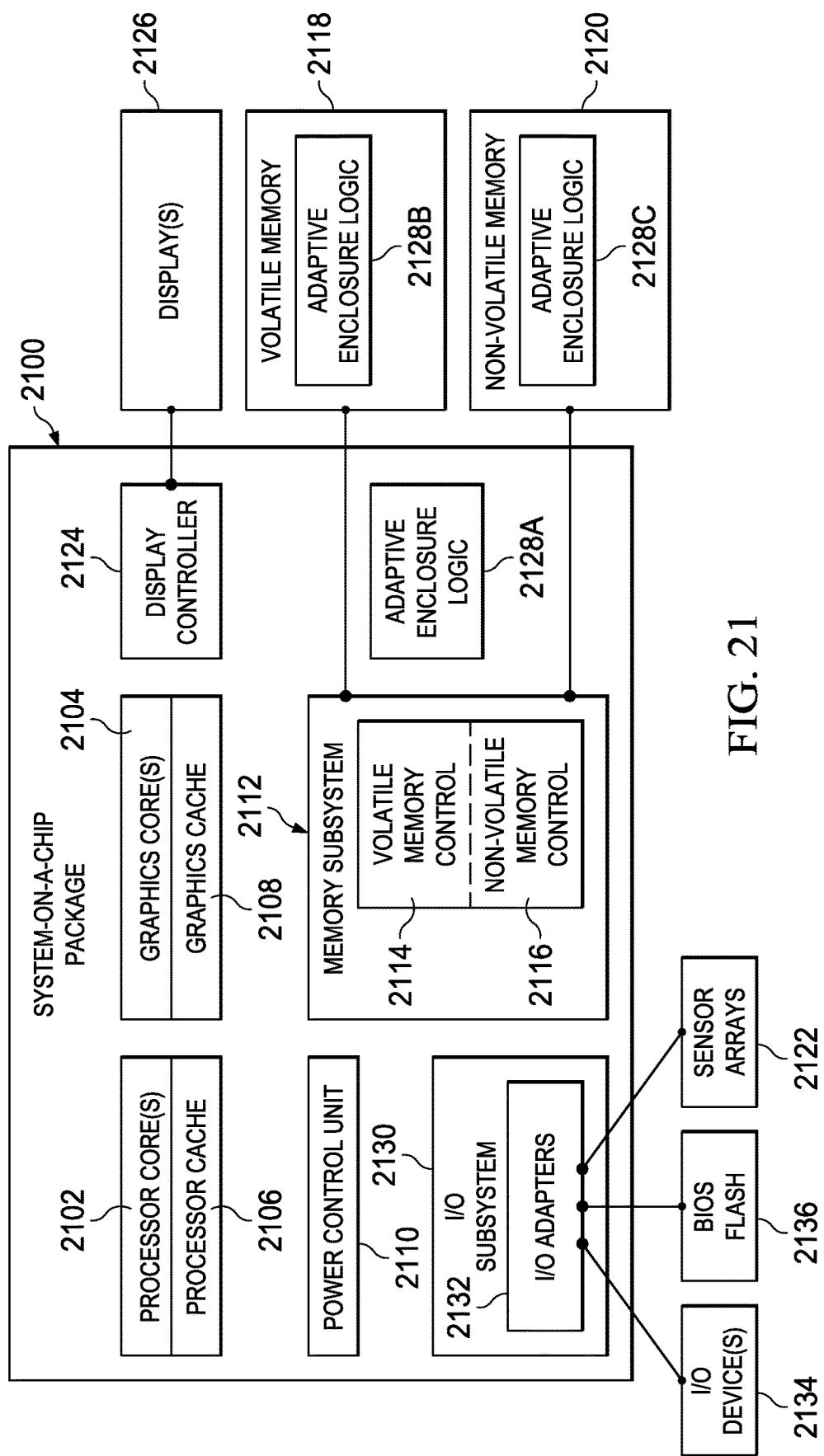
FIG. 21 illustrates an embodiment of a computing device that incorporates the adaptive enclosure.

FIG. 21 illustrates an embodiment of a computing device that incorporates the adaptive enclosure. The computing device, in many embodiments, comprises a system-on-a-chip (SoC) package 2100 design, which combines processor, graphics, memory, and I/O control logic into one SoC package. Thus, in FIG. 21, processor core(s) 2102, graphics core(s) 2104, their respective caches (2106 and 2108) are all present in the package, along with memory subsystem 2112 and I/O subsystem 2130.

Although not shown, each processor core can internally include one or more instruction/data caches, execution units, prefetch buffers, instruction queues, branch address calculation units, instruction decoders, floating point units, retirement units, etc. Each core present is located on a processor semiconductor die. For each logic unit shown other than the core(s) 2102 in the SoC Package 2100, the logic unit can be on the processor core(s) 2102 semiconductor die in some embodiments or on another die in other embodiments. If a given logic unit is not on the same die as processor core(s) 2102, that logic unit would be on a different semiconductor die, though in the same SoC package 2100, which can include several dies communicatively coupled with each other in the package.

The SoC 2100 also includes at least one lower level processor cache, such as processor cache 2106. This cache can be a general purpose cache capable of storing a significant amount of data retrieved from memory locations in volatile memory 2118 and/or non-volatile memory 2120. In different embodiments, processor cache 2106 is shared among all cores, or each core can have its own lower level cache.

One or more graphics core(s) 2104 are also included in SoC package 2100 as well as a lower level graphics cache 2108 which can store graphics-related data for the graphics core(s) 2104 to work on. Graphics core(s) 2104 can internally include one or more execution units and one or more instruction and data caches utilized to feed the execution units with information to process. Additionally the graphics core(s) 2104 can contain other graphics logic units that are not shown in FIG. 21, such as one or more vertex processing units, rasterization units, media processing units, and codecs among others. For the sake of simplicity, the specific logic within the graphics core(s) 2104 is not shown.

The graphics core(s) 2104 provide data to be displayed. In many embodiments, the graphics core(s) 2104 sends data to a display controller 2124, which in turn populates one or more displays 2126 coupled to the system.

SoC package 2100 can also include a power control unit (PCU) 2110. The PCU 2110 can include logic and components needed for regulating the power state of the core(s) among other tasks. The PCU 2110 can include one or more voltage regulators (VRs).

In FIG. 21, the SoC package 2100 also includes a memory subsystem 2112 that has an integrated volatile memory controller 2114 that can be utilized to provide access to volatile memory 2118. Volatile memory control 2114 can receive a memory access request from a core and route that request to volatile memory 2118. Likewise, non-volatile memory control 2116 can receive a memory access request from a core and route that request to non-volatile memory 2120.

In many embodiments, an input/output (I/O) subsystem 2130 is present in the system in FIG. 21 to communicate with I/O devices, such as I/O device(s) 2134. The I/O subsystem 2130 in FIG. 21 can be integrated into the SoC package 2100. Within the I/O subsystem 2130, one or more I/O adapter(s) 2132 are present to translate a host communication protocol utilized within the processor core(s) 2102 to a protocol compatible with particular I/O devices. Some of the protocols for which adapters can be utilized for translation include Peripheral Component Interconnect (PCI)-Express (PCI-E), 3.0; Universal Serial Bus (USB), 3.0; Serial Advanced Technology Attachment (SATA), 3.0; Small Computer System Interface (SCSI), Ultra-640; and Institute of Electrical and Electronics Engineers (IEEE) 1594 "Firewire;" among others.

Additionally, there can be one or more wireless protocol I/O adapters. Examples of wireless protocols, among others, are used in personal area networks, such as IEEE 802.15 and Bluetooth, 4.0; wireless local area networks, such as IEEE 802.11-based wireless protocols; and cellular protocols A Basic Input/Output System (BIOS) flash device 2136 can additionally be present in the system to provide a set of boot instructions when the system powers on or reboots. For BIOS flash device 2136, some of the protocols for which the I/O adapters 2134 can translate include Serial Peripheral Interface (SPI) and Microwire, among others.

In many embodiments, one or more sensor arrays 2122 also are coupled to the I/O subsystem 2130. The sensor arrays 2122 can include the capacitive touch sensor arrays as described above.

In different embodiments, the adaptive enclosure logic (AEL), described in detail above, can be present in hardware logic 2128A, in software logic 2128B, in firmware logic 2128C, or in a combination of these locations.

Processor core(s) 2102 are examples of processing means for executing the various algorithms set forth in this description. Caches 2106, 2108, volatile memory 2118, non-volatile memory 2120, and flash device 2136 are examples of storing means for storing various instructions and variables described in this disclosure. Examples of a sensing means include sensor arrays 2122, pressure and temperature sensors, and cameras. Display 2126 is an example of a displaying means that displays the images and other outputs described above.

The algorithms described above can be stored in a transitory medium or a non-transitory medium. A transitory medium can include a propagating wave (including an electromagnetic wave), a signal traveling along a wire (such as a telephone line or an ISDN connection), and software instructions absent a processor. A non-transitory medium includes caches 2106, 2108, volatile memory 2118, non-volatile memory 2120, and flash device 2136. A non-transitory medium can include a read-only memory (ROM), a random access memory (RAM), a hard drive (including, but not limited to, magnetic or solid state), an optical disc (e.g., a CD-ROM, a DVD, or a Blu-Ray disc), an optomagnetic disc, and a flash memory.

In addition, the mobile devices described herein can receive and install software to execute the algorithms previously set forth. In such a case, the device can receive software (e.g., a software package) over a wireless connection (e.g., a Bluetooth or a 3G or 4G connection) from a server. In such a case, the package received by the mobile device produces (e.g., upon installation) the software that executes the algorithms and does not necessarily itself execute the algorithms.

Further, the computing device shown in FIG. 21 can include a battery. Such a power source is particularly advantageous in an embodiment in which the computing device is portable. Although the battery can be non-rechargeable, the battery is typically rechargeable, such as by way of a jack on one of the sides of the computing device.

Numerous other changes, substitutions, variations, alterations, and modifications may be ascertained to one skilled in the art. It is intended the present disclosure encompass all such changes, substitutions, variations, alterations, and modifications as falling within the scope of the appended claims. To assist the United States Patent and Trademark Office (USPTO) and, additionally, any readers of any patent issued on this application in interpreting the claims appended hereto, Applicants wish to note the Applicants: (a) do not intend any of the appended claims to invoke 35 U.S.C. section 112(f) as it exists on the date of the filing hereof unless the words "means for" or "step for" are specifically used in the particular claims; and (b) do not intend, by any statement in the specification, to limit this disclosure in any way that is not otherwise reflected in the appended claims.

The following examples pertain to some embodiments of the disclosure.

Example 1 is a device to receive user inputs, comprising: an enclosure including a plurality of capacitive touch sensor arrays disposed at least on two of a top side, a bottom side, a left side, a right side, a front side, and a back side of the device, and a first display on the front side of the device; and logic configured to receive touch interaction information from the plurality of capacitive touch sensor arrays, and to initiate an action based at least in part on the touch interaction information.

In Example 2, the subject matter of Example 1 can optionally include the first display including a first capacitive touch sensor array of the plurality of capacitive touch sensor arrays, and the enclosure further including, on the back side of the device, a second display at least with a second capacitive touch sensor array of the plurality of capacitive touch sensor arrays.

In Example 3, the subject matter of Example 1 or 2 can optionally include the logic being further configured to identify a user by detecting a grip of the enclosure.

In Example 4, the subject matter of any one of Examples 1-3 can optionally include the logic being further configured to ignore a portion of the touch interaction information in response to a determination that the portion is a result of hand jitter, at least in part based on the touch interaction information.

In Example 5, the subject matter of any one of Examples 1-4 can optionally include the logic being further configured to identify a user using a usage model learned at least in part based on the touch interaction information.

In Example 6, the subject matter of any one of Examples 1-5 can optionally include the logic being further configured to implement a backside pointer in response to a determination that a finger is within a predetermined distance from the back side of the device.

In Example 7, the subject matter of any one of Examples 1-6 can optionally include the logic receiving the touch interaction information from a functional button displayed on the device in two or more different locations of the enclosure.

In Example 8, the subject matter of any one of Examples 1-7 can optionally include the touch interaction information including a swipe in one direction on the front side of the device and a swipe in the opposite direction on the back side of the device, and the logic being further configured to rotate a three-dimensional object at least in part based on the swipe in the one direction and the swipe in the opposite direction.

In Example 9, the subject matter of any one of Examples 1-8 can optionally include the touch interaction information including a hold on the back side of the device and a swipe on the front side of the device, and the logic being further configured to manipulate an image at least in part based on the hold and the swipe.

In Example 10, the subject matter of any one of Examples 1-9 can optionally include the touch interaction information including a swipe across the back side of the device, and the logic being further configured to roll a three-dimensional object on the first display at least in part based on the swipe.

In Example 11, the subject matter of any one of Examples 1-10 can optionally include the logic being further configured to initiate a same action based on a swipe received on the back side of the device as an action initiated based on a swipe received on the front side of the device.

In Example 12, the subject matter of any one of Examples 1-11 can optionally include at least one of the top side, the bottom side, the left side, and the right side including a second display.

In Example 13, the subject matter of any one of Examples 1-12 can optionally include the logic being further configured to cancel touch interaction information received from a touch on the front side of the device in response to a determination that the touch is adjacent to a touch on the left side or the right side of the device.

In Example 14, the subject matter of any one of Examples 1-13 can optionally include the first display displaying an emulated hardware button along a side of the first display.

In Example 15, the subject matter of any one of Examples 1-14 can optionally include the touch interaction information including a press against the front side of the enclosure and a press against the back side of the enclosure, and the logic being further configured to deform a three dimensional object on the first display at least in part based on the press against the front side of the enclosure and the press against the back side of the enclosure.

In Example 16, the subject matter of any one of Examples 1-15 can optionally include the logic being further configured to divide a capacitive touch sensor array on the back side of the enclosure into a plurality of sections, in response to a determination that a number of inputs is less than three.

Example 17 is method to receive user inputs, comprising: receiving touch interaction information from a plurality of capacitive touch sensor arrays disposed at least on two of a top side, a bottom side, a left side, a right side, a front side, and a back side of an enclosure, the enclosure including a display on the front side of the enclosure; and initiating one or more actions based at least in part on the received touch interaction information.

In Example 18, the subject matter of Example 17 can optionally include the display including a first capacitive touch sensor array of the plurality of capacitive touch sensor arrays, and the enclosure further including, on the back side, another display at least with a second capacitive touch sensor array of the plurality of capacitive touch sensor arrays.

In Example 19, the subject matter of Example 17 or 18 can optionally include identifying a user by detecting a grip of the enclosure.

In Example 20, the subject matter of any one of Examples 17-19 can optionally include ignoring a portion of the touch interaction information in response to a determination that the portion is a result of hand jitter, at least in part based on the touch interaction information.

In Example 21, the subject matter of any one of Examples 17-20 can optionally include identifying a user using a usage model learned at least in part based on the touch interaction information.

In Example 22, the subject matter of any one of Examples 17-21 can optionally include implementing a backside pointer in response to a determination that a finger is within a predetermined distance from the back side of the enclosure.

In Example 23, the subject matter of any one of Examples 17-22 can optionally include the touch interaction information being received from a functional button displayed on the enclosure in two or more different locations of the enclosure.

In Example 24, the subject matter of any one of Examples 17-23 can optionally include the touch interaction information including a swipe in one direction on the front side of the enclosure and a swipe in the opposite direction on the back side of the enclosure, and a three-dimensional object on the display being rotated at least in part based on the swipe in the one direction and the swipe in the opposite direction.

In Example 25, the subject matter of any one of Examples 17-24 can optionally include the touch interaction information including a hold on the back side of the enclosure and a swipe on the front side of the enclosure, and an image on the display being manipulated at least in part based on the hold and the swipe.

In Example 26, the subject matter of any one of Examples 17-25 can optionally include the touch interaction information including a swipe across the back side of the enclosure, and a three-dimensional object on the display being rolled at least in part based on the swipe.

In Example 27, the subject matter of any one of Examples 17-26 can optionally include initiating a same action based on a swipe received on the back side of the enclosure as an action initiated based on a swipe received on the front side of the enclosure.

In Example 28, the subject matter of any one of Examples 17-27 can optionally include at least one of the top side, the bottom side, the left side, and the right side including a second display.

In Example 29, the subject matter of any one of Examples 17-28 can optionally include canceling touch interaction information received from a touch on the front side of the enclosure in response to a determination that the touch is adjacent to a touch on the left side or the right side of the enclosure.

In Example 30, the subject matter of any one of Examples 17-29 can optionally include displaying an emulated hardware button along a side of the display.

In Example 31, the subject matter of any one of Examples 17-30 can optionally include the touch interaction information including a press against the front side of the enclosure and a press against the back side of the enclosure, and a three dimensional object on the first display being deformed at least in part based on the press against the front side of the enclosure and the press against the back side of the enclosure.

In Example 32, the subject matter of any one of Examples 17-31 can optionally include dividing a capacitive touch sensor array on the back side of the enclosure into a plurality of sections, in response to a determination that a number of inputs is less than three.

Example 33 is a non-transitory computer readable medium that stores instructions that, when executed by a processor, cause the processor to perform a method to receive user inputs comprising: receiving touch interaction information from a plurality of capacitive touch sensor arrays disposed at least on two of a top side, a bottom side, a left side, a right side, a front side, and a back side of an enclosure; and initiating one or more actions based at least in part on the received touch interaction information.

In Example 34, the subject matter of Example 33 can optionally include the front side including a first display including a first capacitive touch sensor array of the plurality of capacitive touch sensor arrays, and the enclosure further including, on the back side, a second display at least with a second capacitive touch sensor array of the plurality of capacitive touch sensor arrays.

In Example 35, the subject matter of Example 33 or 3 can optionally include the method further comprising: identifying a user by detecting a grip of the enclosure.

In Example 36, the subject matter of any one of Examples 33-35 can optionally include the method further comprising: ignoring a portion of the touch interaction information in response to a determination that the portion is a result of hand jitter, at least in part based on the touch interaction information.

In Example 37, the subject matter of any one of Examples 33-36 can optionally include the method further comprising: identifying a user using a usage model learned at least in part based on the touch interaction information.

In Example 38, the subject matter of any one of Examples 33-37 can optionally include the method further comprising: implementing a backside pointer in response to a determination that a finger is within a predetermined distance from the back side of the enclosure.

In Example 39, the subject matter of any one of Examples 33-38 can optionally include the touch interaction information being received from a functional button displayed on the enclosure in two or more different locations of the enclosure.

In Example 40, the subject matter of any one of Examples 33-39 can optionally include the touch interaction information including a swipe in one direction on the front side of the enclosure and a swipe in the opposite direction on the back side of the enclosure, and a three-dimensional object on a display on the front side of the enclosure being rotated at least in part based on the swipe in the one direction and the swipe in the opposite direction.

In Example 41, the subject matter of any one of Examples 33-40 can optionally include the touch interaction information including a hold on the back side of the enclosure and a swipe on the front side of the enclosure, and an image on a display on the front side of the enclosure being manipulated at least in part based on the hold and the swipe.

In Example 42, the subject matter of any one of Examples 33-41 can optionally include the touch interaction information including a swipe across the back side of the enclosure, and a three-dimensional object on a display on the front side of the enclosure being rolled at least in part based on the swipe.

In Example 43, the subject matter of any one of Examples 33-42 can optionally include the method further comprising: initiating a same action based on a swipe received on the back side of the enclosure as an action initiated based on a swipe received on the front side of the enclosure.

In Example 44, the subject matter of any one of Examples 33-43 can optionally include the front side of the enclosure including a first display, and at least one of the top side, the bottom side, the left side, and the right side including a second display.

In Example 45, the subject matter of any one of Examples 33-44 can optionally include the method further comprising: canceling touch interaction information received from a touch on the front side of the enclosure in response to a determination that the touch is adjacent to a touch on the left side or the right side of the enclosure.

In Example 46, the subject matter of any one of Examples 33-45 can optionally include the method further comprising: displaying an emulated hardware button along a side of a display on the front side of the enclosure.

In Example 47, the subject matter of any one of Examples 33-46 can optionally include the touch interaction information including a press against the front side of the enclosure and a press against the back side of the enclosure, and a three dimensional object on a display on the front side of the enclosure being deformed at least in part based on the press against the front side of the enclosure and the press against the back side of the enclosure.

In Example 48, the subject matter of any one of Examples 33-47 can optionally include the method further comprising: dividing a capacitive touch sensor array on the back side of the enclosure into a plurality of sections, in response to a determination that a number of inputs is less than three.

Example 49 is a device to receive user inputs, comprising: an enclosure including a sensing means disposed at least on two of a top side, a bottom side, a left side, a right side, a front side, and a back side of the device, and a first displaying means on the front side of the device; and processing means for receiving touch interaction information from the sensing means, and for initiating an action based at least in part on the touch interaction information.

In Example 50, the subject matter of Example 49 can optionally include the first displaying means including a first sensing means of the sensing means, and the enclosure further including, on the back side of the device, a second displaying means at least with a second sensing means of the sensing means.

In Example 51, the subject matter of Example of 49 or 50 can optionally include the processing means identifying a user by detecting a grip of the enclosure.

In Example 52, the subject matter of any one of Examples 49-51 can optionally include the processing means ignoring a portion of the touch interaction information in response to a determination that the portion is a result of hand jitter, at least in part based on the touch interaction information.

In Example 53, the subject matter of any one of Examples 49-52 can optionally include the processing means identifying a user using a usage model learned at least in part based on the touch interaction information.

In Example 54, the subject matter of any one of Examples 49-53 can optionally include the processing means implementing a backside pointer in response to a determination that a finger is within a predetermined distance from the back side of the device.

In Example 55, the subject matter of any one of Examples 49-54 can optionally include the processing means receiving the touch interaction information from a functional button displayed on the device in two or more different locations of the enclosure.

In Example 56, the subject matter of any one of Examples 49-55 can optionally include the touch interaction information including a swipe in one direction on the front side of the device and a swipe in the opposite direction on the back side of the device, and the processing means rotating a three-dimensional object at least in part based on the swipe in the one direction and the swipe in the opposite direction.

In Example 57, the subject matter of any one of Examples 49-56 can optionally include the touch interaction information including a hold on the back side of the device and a swipe on the front side of the device, and the processing means manipulating an image at least in part based on the hold and the swipe.

In Example 58, the subject matter of any one of Examples 49-57 can optionally include the touch interaction information including a swipe across the back side of the device, and the processing means rolling a three-dimensional object on the first displaying means at least in part based on the swipe.

In Example 59, the subject matter of any one of Examples 49-58 can optionally include the processing means initiating a same action based on a swipe received on the back side of the device as an action initiated based on a swipe received on the front side of the device.

In Example 60, the subject matter of any one of Examples 49-59 can optionally include at least one of the top side, the bottom side, the left side, and the right side including a second displaying means.

In Example 61, the subject matter of any one of Examples 49-60 can optionally include the processing means canceling touch interaction information received from a touch on the front side of the device in response to a determination that the touch is adjacent to a touch on the left side or the right side of the device.

In Example 62, the subject matter of any one of Examples 49-61 can optionally include the first displaying means displaying an emulated hardware button along a side of the first displaying means.

In Example 63, the subject matter of any one of Examples 49-62 can optionally include the touch interaction information including a press against the front side of the enclosure and a press against the back side of the enclosure, and the processing means deforming a three dimensional object on the first displaying means at least in part based on the press against the front side of the enclosure and the press against the back side of the enclosure.

In Example 64, the subject matter of any one of Examples 49-63 can optionally include the processing means dividing a capacitive touch sensor array on the back side of the enclosure into a plurality of sections, in response to a determination that a number of inputs is less than three.

In Example 65, the subject matter of any one of Examples 1-16, can optionally include a fourth display on at least one of the top side, the bottom side, the left side, the right side, and the back side of the device, the touch interaction information including a first touch on the front side and a second touch on at least one side of the top side, the bottom side, the left side, the right side, and the back side, the logic being further configured to manipulate a three-dimensional object at least in part based on the first touch and the second touch, and the first display and the fourth display displaying different views of the three-dimensional object.

In Example 66, the subject matter of any one of Examples 3-16 and 65 can optionally include the logic being further configured to ignore a portion of the touch interaction information at least in part based on grip detection locations corresponding to the grip of the enclosure.

In Example 67, the subject matter of any one of Examples 17-32 can optionally include manipulating a three-dimensional object at least in part based on a first touch on the front side of the enclosure and a second touch on at least one side of the top side, the bottom side, the left side, the right side, and the back side of the enclosure; and displaying different views of the three-dimensional object on the display and a third display on at least one of the top side, the bottom side, the left side, the right side, and the back side of the enclosure.

In Example 68, the subject matter of any one of Examples 19-32 and 67 can optionally include ignoring a portion of the touch interaction information at least in part based on grip detection locations corresponding to the grip of the enclosure.

In Example 69, the subject matter of any one of Examples 33-48 can optionally include the method further comprising: manipulating a three-dimensional object at least in part based on a first touch on the front side of the enclosure and a second touch on at least one side of the top side, the bottom side, the left side, the right side, and the back side of the enclosure; and displaying different views of the three-dimensional object on displays on at least two of the top side, the bottom side, the left side, the right side, the front side, and the back side of the enclosure.

In Example 70, the subject matter of any one of Examples 35-48 and 69 can optionally include the method further comprising: ignoring a portion of the touch interaction information at least in part based on grip detection locations corresponding to the grip of the enclosure.

In Example 71, the subject matter of any one of Examples 49-65 can optionally include a fourth displaying means on at least one of the top side, the bottom side, the left side, the right side, and the back side of the device, the touch interaction information including a first touch on the front side and a second touch on at least one side of the top side, the bottom side, the left side, the right side, and the back side of the device, the processing means manipulating a three-dimensional object at least in part based on the first touch and the second touch, and the first displaying means and the fourth displaying means displaying different views of the three-dimensional object.

In Example 72, the subject matter of any one of Examples 49-65 and 71 can optionally include the processing means ignoring a portion of the touch interaction information at least in part based on grip detection locations corresponding to the grip of the enclosure.

Example 73 is a device, comprising: logic, at least partially implemented in hardware, to receive touch interaction information from a plurality of touch sensor arrays disposed at least on two of a top side, a bottom side, a left side, a right side, a front side, and a back side of the device, and to initiate an action based at least in part on the touch interaction information.

In Example 74, the subject matter of Example 73 can optionally include the touch interaction information being received from a first touch sensor array of the plurality of touch sensor arrays on the front side of the device and from a second touch sensor array of the plurality of touch sensor arrays on the back side of the device.

In Example 75, the subject matter of any one of Examples 73-74 can optionally include the logic being to identify a user by detecting a grip of the device.

In Example 76, the subject matter of any one of Examples 73-75 can optionally include the logic being to ignore a portion of the touch interaction information in response to a determination that the portion is a result of hand jitter.

In Example 77, the subject matter of any one of Examples 73-76, can optionally include the logic being to identify a user using a usage model learned based at least in part on the touch interaction information.

In Example 78, the subject matter of any one of Examples 73-77 can optionally include the logic being to implement a backside pointer in response to a determination that a finger is within a predetermined distance from the back side of the device.

In Example 79, the subject matter of any one of Examples 73-78 can optionally include the logic being to receive the touch interaction information from a functional button displayed on the device in two or more different locations of the device.

In Example 80, the subject matter of any one of Examples 73-79 can optionally include the touch interaction information including a swipe in one direction on the front side of the device and a swipe in the opposite direction on the back side of the device, and the logic being to rotate a three-dimensional object based at least in part on the swipe in the one direction and the swipe in the opposite direction.

In Example 81, the subject matter of any one of Examples 73-80 can optionally include the touch interaction information including a hold on the back side of the device and a swipe on the front side of the device, and the logic being to manipulate an image based at least in part on the hold and the swipe.

In Example 82, the subject matter of any one of Examples 73-81 can optionally include the touch interaction information including a swipe across the back side of the device, and the logic being to roll a three-dimensional object on a display based at least in part on the swipe.

In Example 83, the subject matter of any one of Examples 73-82 can optionally include the logic being to initiate a same action based at least in part on a swipe received on the back side of the device as an action initiated based at least in part on a swipe received on the front side of the device.

In Example 84, the subject matter of any one of Examples 73-83 can optionally include the logic being to display an image on a display on at least one of the top side, the bottom side, the left side, and the right side of the device.

In Example 85, the subject matter of any one of Examples 73-84 can optionally include the logic being to cancel touch interaction information received from a touch on the front side of the device in response to a determination that the touch is adjacent to a touch on the left side or the right side of the device.

In Example 86, the subject matter of any one of Examples 73-85 can optionally include the logic being to display an emulated hardware button along a side of a display on the front side of the device.

In Example 87, the subject matter of any one of Examples 73-86 can optionally include the touch interaction information including a press against the front side of the device and a press against the back side of the device, and the logic being to deform a three-dimensional object on a display on the front side of the device based at least in part on the press against the front side of the device and the press against the back side of the device.

In Example 88, the subject matter of any one of Examples 73-87 can optionally include the logic being to divide a capacitive touch sensor array on the back side of the device into a plurality of sections, in response to a determination that a number of inputs is less than three.

In Example 89, the subject matter of any one of Examples 73-88 can optionally include the logic being to manipulate a three-dimensional object based at least in part on a first touch on the front side of the device and a second touch on at least one side of the top side, the bottom side, the left side, the right side, and the back side of the device, and to display different views of the three-dimensional object on displays on at least two of the top side, the bottom side, the left side, the right side, the front side, and the back side of the device.

In Example 90, the subject matter of any one of Examples 75-89 can optionally include the logic being to ignore a portion of the touch interaction information at least in part based on grip detection locations corresponding to the grip of the device.

We claim:

1. A device to receive user inputs, the device comprising:
   an enclosure including
      a first capacitive touch sensor array disposed on a front face of the device, and
      a display disposed on the front face of the device; and
   logic configured to
      receive touch interaction information defined by a combination gesture including a first gesture on the front face of the device and a second gesture on a back face of the device, the back face of the device including at least one capacitive touch sensor array;
      manipulate an image, based at least in part on the combination gesture; and
      suppress a front touch on the front face of the device, based at least in part on a determination that the front touch is within a distance from a top face of the device, a bottom face of the device, a left face of the device, or a right face of the device.

2. The device of claim 1, wherein the first capacitive touch sensor array is configured to receive the first gesture.

3. The device of claim 1, further comprising:
   a second capacitive touch sensor array disposed on the top face, the bottom face, the left face, or the right face, of the device, wherein
   the logic further is configured to receive touch interaction information from the second capacitive touch sensor array, and to initiate an action, based at least in part on the touch interaction information from the second capacitive touch sensor array.

4. The device of claim 1, wherein the distance is defined by an average fingertip size.

5. The device of claim 1, wherein the distance is between 8-10 mm.

6. The device of claim 1, wherein the logic further is configured to display a plurality of buttons in a vertical column on a right side of the display, based at least in part on a determination that a right hand is holding the device.

7. The device of claim 1, wherein the at least one capacitive touch sensor array is configured to receive the second gesture.

8. The device of claim 7, wherein the touch interaction information indicates a swipe across the back face of the device.

9. The device of claim 1, further comprising:
   a further display disposed on a face selected from the group consisting of the top face, the bottom face, the left face, or the right face, wherein the further display displays volume controls or play controls.

10. The device of claim 1, wherein
    the first gesture is defined by a swipe on the front face of the device, the second gesture is defined by a hold on the back face of the device, and the logic further is configured to manipulate the image by zooming in on the image, based at least in part on the combination gesture.

11. The device of claim 1, wherein visual feedback for a grip suppression area is displayed.

12. The device of claim 1, wherein
    the first gesture is defined by a first press on the front face of the device, the second gesture is defined by a second press on the back face of the device, and the logic further is configured to manipulate the image by deforming the image, which is of a three-dimensional object, on two opposite surfaces, based at least in part on the combination gesture.

13. A non-transitory, computer-readable medium that stores instructions that, when executed by a device, cause the device to perform operations to receive user inputs, the device including a capacitive touch sensor array and a display disposed on a front face of the device, the operations comprising:

receiving touch interaction information defined by a combination gesture including a first gesture on the front face of the device and a second gesture on a back face of the device, the back face of the device including at least one capacitive touch sensor array;

manipulating an image, based at least in part on the combination gesture;

performing a determination that a front touch on the front face of the device is within a distance from a top face of the device, a bottom face of the device, a left face of the device, or a right face of the device; and suppressing the front touch on the front face of the device, based at least in part on the determination.

14. The medium of claim 13, wherein the distance is defined by an average fingertip size or is between 8-10 mm.

15. A method implemented by an apparatus to receive user inputs, the method comprising:

receiving a front touch on a front face of a device, the front face of the device including a capacitive touch sensor array and a display;

receiving touch interaction information defined by a combination gesture including a first gesture on the front face of the device and a second gesture on a back face of the device, the back face of the device including at least one capacitive touch sensor array;

manipulating an image, based at least in part on the combination gesture;

performing a determination that the front touch is within a distance from a top face of the device, a bottom face of the device, a left face of the device, or a right face of the device; and suppressing the front touch on the front face of the device, based at least in part on the determination.

16. The method of claim 15, wherein the distance is defined by an average fingertip size or is between 8-10 mm.

* * * * *